United States Patent
Wang et al.

(10) Patent No.: US 11,548,024 B2
(45) Date of Patent: Jan. 10, 2023

(54) MOTION CONTROL SYSTEM OF SPRAYING MACHINE BASED ON FPGA AND MOTION CONTROL METHOD THEREOF

(71) Applicant: Inner Mongolia University, Hohhot (CN)

(72) Inventors: Shubin Wang, Hohhot (CN); Na Wang, Hohhot (CN)

(73) Assignee: INNER MONGOLIA UNIVERSITY, Hohhot (CN)

( * ) Notice: Subject to any disclaimer, the term of this patent is extended or adjusted under 35 U.S.C. 154(b) by 294 days.

(21) Appl. No.: 16/919,948

(22) Filed: Jul. 2, 2020

(65) Prior Publication Data

US 2021/0060595 A1 Mar. 4, 2021

(30) Foreign Application Priority Data

Aug. 29, 2019 (CN) .......................... 201910810687.8

(51) Int. Cl.
*B05B 12/12* (2006.01)
*B05B 13/04* (2006.01)
*G05B 19/045* (2006.01)

(52) U.S. Cl.
CPC .......... *B05B 12/12* (2013.01); *B05B 13/0421* (2013.01); *G05B 19/045* (2013.01); *G05B 2219/21109* (2013.01)

(58) Field of Classification Search
USPC ................ 118/321, 323, 679–681, 695–698; 700/123
See application file for complete search history.

(56) References Cited

U.S. PATENT DOCUMENTS 6,949,142 B2 * 9/2005 Charpin ............. G05B 19/0421
118/698

* cited by examiner

*Primary Examiner* — Yewebdar T Tadesse
(74) *Attorney, Agent, or Firm* — Hemisphere Law, PLLC; Zhigang Ma

(57) ABSTRACT

A motion control system of spraying machine based on FPGA, includes a motion controller. The motion controller includes an information analysis module, a speed control module and an interpolation module. The information analysis module is used for decoding the motion information to obtain the action information of the lance in a three-dimensional direction, and the rotation information of the clamp and the lance. The speed control module is used for driving the lance to a target position through the first motors according to the action information, and changing the speed of the interpolation movement of the lance in the three-dimensional direction into a trapezoid acceleration and deceleration. The interpolation module includes a first interpolation unit, a second interpolation unit and a control unit. The motion control system has high processing accuracy, fast reaction speed and good real-time performance.

19 Claims, 18 Drawing Sheets

# MOTION CONTROL SYSTEM OF SPRAYING MACHINE BASED ON FPGA AND MOTION CONTROL METHOD THEREOF

FIELD OF THE INVENTION

The present invention relates to systems of spraying machine, and more particularly to a motion control system of spraying machine based on Field Programmable Gate Array (FPGA) and a motion control method thereof.

BACKGROUND OF THE INVENTION

In the manufacturing industry, almost all electromechanical products need to be painted on the surface. Spraying is a surface treatment technique in which covers the surface of an applied object a lance, and makes it adhere firmly to the coating. For example, some common metal and plastic products, and even many equipment in military and aerospace fields, need to be sprayed for decorating, marking and protecting the products. The performance of a spraying machine has a significant impact on product quality and output.

The spraying machine needs precise motion control, and the motion control needs to be realized through a good motion control system. However, the existing motion control system is mainly controlled by the microprocessor or motion control chip, and its processing accuracy is not high enough, the speed is slow and the real-time performance is poor.

SUMMARY OF THE INVENTION

Therefore, the object of the present invention is to provide a motion control system of spraying machine based on FPGA, which has high processing accuracy, fast reaction speed and good real-time performance.

The another object of the present invention provides a motion control method, which applies to the motion control system of spraying machine. The method has the advantages of high processing accuracy, fast reaction speed and good real-time performance for controlling the spraying machine.

The present invention provides a motion control system of spraying machine based on FPGA, includes:

a motion controller, for receiving a motion information and controlling a spraying machine with the motion information; the spraying machine includes a clamp, a lance, three first motors and two second motors; the motion controller includes:

an information analysis module, for decoding the motion information to obtain the action information of the lance in a three-dimensional direction, and the rotation information of the clamp and the lance; in the three-dimensional direction, each dimension corresponds to a register and an interpolation accumulator;

a speed control module, for driving the lance to a target position through the first motors according to the action information, and changing the speed of the interpolation movement of the lance in the three-dimensional direction into a trapezoid acceleration and deceleration; and an interpolation module, includes:
a first interpolation unit, for storing the displacement in the direction of each dimension in the corresponding register, and accumulating the displacement in the corresponding interpolation accumulator at intervals of a preset time interval, and the overflow pulse generated by each accumulation in the corresponding interpolation accumulator is used as an impulse equivalent to drive the corresponding first motor for linear interpolation;

a second interpolation unit, for storing the initial values of two axes in the registers corresponding to the other axis, and accumulating in two interpolation accumulators corresponding to the two axes respectively, and the overflow pulse generated by each accumulation in each interpolation accumulator is used as an equivalent pulse to drive the first motor corresponding to another axis for circular interpolation; and a control unit, for rotating the clamp or the lance to reach a specified position by driving the corresponding second motor, according to the rotation information.

In the motion control system of the present invention, further includes:

a primary processor, for sending the motion information to the motion controller.

In the motion control system of the present invention, the first motors are used for driving the lance to move linearly along the three-dimensional direction respectively, and the second motors are used for driving the clamp and the lance to rotate respectively.

In the motion control system of the present invention, the action information includes the initial speed, given feed speed, acceleration, feed distance, initial coordinate value, endpoint coordinate value and displacement of the lance in the three-dimensional direction, the rotation information includes the rotation direction and rotation of the clamp and the lance.

In the motion control system of the present invention, the speed control module is used for calculating the travel distance and travel time of each axial direction of the lance in the acceleration stage, uniform speed stage and deceleration stage according to the initial speed, the given feed speed, the acceleration and the feed distance, and then transmitting the corresponding travel information to each of the first motors, so that the first motors drive the lance to the target position according to the corresponding travel information.

In the motion control system of the present invention, the calculation method of the feed distance includes:

(1) calculating the total time of the lance in the acceleration stage, uniform speed stage and deceleration stage;

(2) calculating the first product of the total time and the initial speed;

(3) calculating the first square of the acceleration time in the acceleration stage, the second square of the deceleration time in the deceleration stage, the second product of the acceleration time and the deceleration time, and the third product of the acceleration time and the uniform time in the uniform speed stage;

(4) accumulating the first square, twice the second product, and twice the third product, then subtracting the second square from the sum result;

(5) calculating the third product of half the acceleration and the calculation result in step (4); and (6) accumulating the first product with the calculation result in step (5), and the addition result is equal to the feed distance.

In the motion control system of the present invention, the acceleration time is equal to the deceleration time, and the calculation method of the acceleration time includes:

(3.1) calculating the first difference between the given feed speed and the initial speed; and (3.2) calculating the first ratio of the first difference to the acceleration, and the first ratio is equal to the acceleration time.

In the motion control system of the present invention, the calculation method of the uniform time includes:

(3.3) calculating the third square of the given feed speed and the fourth square of the initial speed, then calculating the second difference between the third square and the fourth square;

(3.4) calculating the second ratio of the second difference to the acceleration;

(3.5) calculating the third difference between the feed distance and the second ratio; and (3.6) calculating the third ratio of the third difference to the given feed speed, and the third ratio is equal to the uniform time.

In the motion control system of the present invention, the acceleration distance and the deceleration distance are both equal to half the second ratio, the uniform distance is equal to the fourth difference between the feed distance and the second ratio.

In the motion control system of the present invention, the initial position of the lance is defined as the original point, and the coordinate of the final position of the lance is ($x_e$, $y_e$, $z_e$); the displacement of the lance in the X-axis direction is equal to the product of a constant, the accumulated times of interpolation accumulator, and the coordinate value $x_e$; the displacement of the lance in the Y-axis direction is equal to the product of the constant, the accumulated times, and the coordinate value $y_e$; the displacement of the lance in the Z-axis direction is equal to the product of the constant, the accumulated times, and the coordinate value $z_e$.

In the motion control system of the present invention, the product of the constant and the accumulated times is equal to 1.

In the motion control system of the present invention, the register is an m bit register, and the maximum capacity is equal to the difference between two to the power of m and 1; the accumulated times is equal to two to the power of m.

In the motion control system of the present invention, in the two-dimensional plane, the calculation method of the driving displacement of the second interpolation unit in one axis direction includes:

(3.7) calculating the fourth product of the real-time position coordinate of the other axis and the incremental time of the second interpolation unit;

(3.8) accumulating the fourth product in each increment; and (3.9) calculating the fourth ratio of the result in step (3.8) to two to the power of m, and the fourth ratio is equal to the driving displacement.

In the motion control system of the present invention, further includes:

an interaction module, includes:

a keying circuit, which has a plurality of keypad switches arranged in a matrix; the keypad switches in each line are connected at one end and the connected ends are formed as a line output end, the keypad switches in each column are connected at the other end and the other connected ends are formed as a column output end;

a keying judgment unit, for determining the on-off state of the keypad switches according to the state changings of the line output ends and the column output ends, and transmitting the corresponding state information; and a display circuit, for displaying the on-off state according to the keying judgment unit.

In the motion control system of the present invention, keying judgment unit is used for transmitting the state information to the primary processor and the display circuit; the primary processor generates the motion information according to the state information.

In the motion control system of the present invention, the speed control module includes:

a first divider, for dividing the frequency of the generated system clock to generate a sampling pulse;

an integrator, for multiply the sampling pulse with the given feed speed to obtain a speed increment;

a speed accumulator, for accumulating the initial speed with the speed increment to obtain the real-time speed of the lance;

a first comparator, for comparing the real-time speed and the given feed speed;

a second divider, for calculating the clock frequency according to the frequency of an output pulse when the real-time speed is less than the given feed speed;

a third divider, for dividing the clock frequency and generating an output pulse for driving the first motors to accelerate;

a counter, for counting the output pulse and generating a count value; and a second comparator, for comparing twice the count value and a preset total number of pulses; when the total number is no more than twice the count value, the motion controller is used for slowing down the lance through the first motors.

In the motion control system of the present invention, the primary processor is an ARM chip of STM32F407ZGT6, the motion controller is a chip of EP2C35F484C8N; the primary processor is connected to the motion controller through a bus module.

In the motion control system of the present invention, further includes:

a power module, includes:

a first voltage conversion circuit, for converting an external input voltage of 24V to a voltage of 5V;

a second voltage conversion circuit, for converting the voltage of 5V to a voltage of 3.3V; and a third voltage conversion circuit, for converting the voltage of 3.3V to a voltage of 1.2V.

The present invention provides another motion control system of spraying machine based on FPGA, includes:

a spraying device, includes:

a clamp;

a lance;

three first motors, for driving the lance to move linearly along the three-dimensional direction respectively; and two second motors, for driving the clamp and the lance to rotate respectively;

a primary processor, for sending a motion information; and a motion controller, the motion controller includes:

an information analysis module, for decoding the motion information to obtain the action information of the lance in a three-dimensional direction, and the rotation information of the clamp and the lance; in the three-dimensional direction, each dimension corresponds to a register and an interpolation accumulator;

a speed control module, for driving the lance to a target position through the first motors according to the action information, and changing the speed of the interpolation movement of the lance in the three-dimensional direction into a trapezoid acceleration and deceleration; and an interpolation module, includes:

a first interpolation unit, for storing the displacement in the direction of each dimension in the corresponding register, and accumulating the displacement in the corresponding interpolation accumulator at intervals of a preset time interval, and the overflow pulse generated by each accumulation in the corresponding interpolation accumulator is used as an impulse equivalent to drive the corresponding first motor for linear interpolation;

a second interpolation unit, for storing the initial values of two axes in the registers corresponding to the other axis, and accumulating in two interpolation accumulators corresponding to the two axes respectively, and the overflow pulse generated by each accumulation in each interpolation accumulator is used as an equivalent pulse to drive the first motor corresponding to another axis for circular interpolation; and a control unit, for rotating the clamp or the lance to reach a specified position by driving the corresponding second motor, according to the rotation information.

The present invention also provides a motion control method, for controlling a spraying machine; the spraying machine includes a clamp, a lance, three first motors and two second motors; the method includes:

receiving a motion information;

decoding the motion information to obtain the action information of the lance in a three-dimensional direction, and the rotation information of the clamp and the lance; in the three-dimensional direction, each dimension corresponds to a register and an interpolation accumulator;

driving the lance to a target position through the first motors according to the action information, and changing the speed of the interpolation movement of the lance in the three-dimensional direction into a trapezoid acceleration and deceleration;

storing the displacement in the direction of each dimension in the corresponding register, and accumulating the displacement in the corresponding interpolation accumulator at intervals of a preset time interval, and the overflow pulse generated by each accumulation in the corresponding interpolation accumulator is used as an impulse equivalent to drive the corresponding first motor for linear interpolation;

storing the initial values of two axes in the registers corresponding to the other axis, and accumulating in two interpolation accumulators corresponding to the two axes respectively, and the overflow pulse generated by each accumulation in each interpolation accumulator is used as an equivalent pulse to drive the first motor corresponding to another axis for circular interpolation; and rotating the clamp or the lance to reach a specified position by driving the corresponding second motor, according to the rotation information.

Solution of the present invention, for solving the above problem, is that apply the motion controller to control the spraying machine with the motion information. When accelerating or decelerating, the current speed of the lance changes according to a given acceleration, so that the control process is simple, the resource consumption is small, the response is quick, the processing speed is fast, and the efficiency and real-time performance are relatively high. The interpolation module can select the first interpolation unit or the second interpolation unit to work, select the corresponding interpolation mode, and then output the direction and displacement pulse of each axis to the respective motor for driving after interpolation, so as to complete the linear or circular interpolation through the rotation of the motor. In addition, the control unit drives the corresponding second motors to control the corresponding clamp or lance to rotate and keep it perpendicular to the spray plane. In the interpolation process of the interpolation module, by using the initial data stored in a register firstly, and then to the inside of differential accumulation until a pulse overflow, while the pulse is as an equivalent pulse, it runs fast. Further, the pulse distribution is uniformity, and the motion controller can complete interpolation of multi-axis linkage machine with high processing accuracy and guarantee the real time.

Moreover, the primary processor and the motion controller can use the scheme of ARM+FPGA, this can meet a variety of requirements such as low cost, high precision, and can complete the spray to the task safe and reliable. In addition, ARM has strong real-time performance, and the control and management performance are good. Similarly, the motion control algorithm is implemented inside the FPGA, which can simultaneously control the motion of five motor axes, improving the accuracy and speed of motion control, and has extensibility.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

First Embodiment

Figure 1:
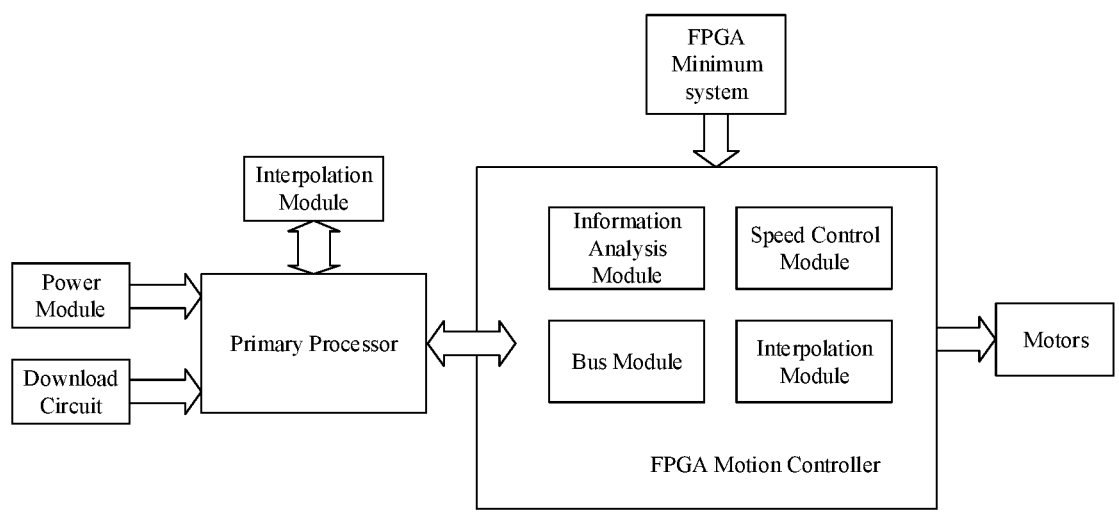
FIG. 1 is a system block diagram of a motion control system of spraying machine based on FPGA, according to the first embodiment of the present invention.

Referring to FIG. 1, a motion control system of spraying machine based on FPGA is shown as an embodiment. The motion control system is used for controlling a five-axis automatic spraying machine, which can realize speed control and trajectory interpolation. In this embodiment, the motion control system includes a motion controller, a primary processor and peripheral circuits, the primary processor may not be set in some other embodiments.

The spraying machine includes a clamp, a lance, three first motors and two second motors. The first motors are used for driving the lance to move linearly along the three-dimensional direction respectively, and the second motors are used for driving the clamp and the lance to rotate respectively.

The primary processor is used for sending the motion information to the motion controller. In this embodiment, the primary processor is an ARM chip of STM32F407ZGT6, and connected to the motion controller through a bus module. The primary processor and the motion controller can be integrated together to form a new processor.

The motion controller includes an information analysis module, a speed control module, an interpolation module and the bus module. The motion controller is a chip of EP2C35F484C8N, which belongs to FPGA chips. The peripheral circuits include an interaction module, a power module, a download circuit, a driving circuit for motors, a clock and recovery circuit, a bus interface circuit, an isolation circuit for input and output, and an LCD display circuit.

The information analysis module is used for decoding the motion information to obtain the action information of the lance in a three-dimensional direction, and the rotation information of the clamp and the lance. In the three-dimensional direction, each dimension corresponds to a register and an interpolation accumulator. In this embodiment, the action information includes the initial speed, given feed speed, acceleration, feed distance, initial coordinate value, endpoint coordinate value and displacement of the lance in the three-dimensional direction, the rotation information includes the rotation direction and rotation of the clamp and the lance. The information analysis module can realize the allocation of register addresses, receiving data and decoding, and it determines the interpolation mode to be executed according to the input.

Figure 2:
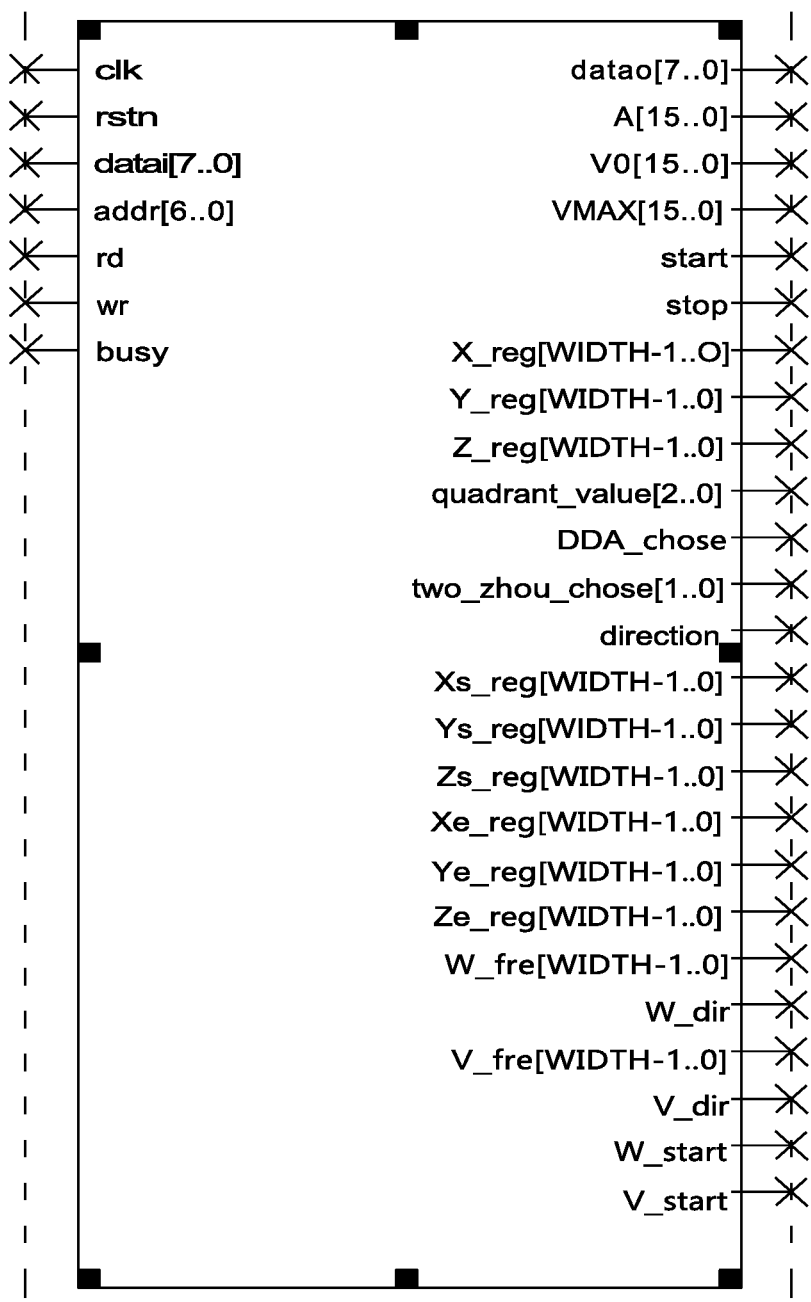
FIG. 2 is a diagram of the information analysis module of the motion controller of the motion control system of FIG. 1.

Referring to FIG. 2, in the input ports of the information analysis module, the pin clk is the pin of the input system clock, the pin rstn is a pin for inputting the reset signal, the controller is reset at a low level, and the module starts to initialize. The pin busy represents that the signal was selected at high level. The pin data [7:0] represents the transmitted eight-bit data signal, the pin addr [6:0] is the input pin, and representing a 6-bit address plus a read/write command. The write signal pin wr writes instructions and data to the register addresses at a high level, the read signal pin rd reads the data in the corresponding address at a low level.

In the output ports of the information analysis module, the pin start is used for starting the interpolation module at a high level. The pin DDA_chose is used as a pin of a signal to select the interpolation mode, and when the value is 0, it means to perform linear interpolation, but when it is 1, it means to perform arc interpolation. The pin quadrant_value represents the selection of quadrants. The two_zhou_chose represents the signal of which two axes to select for planar arc interpolation, when the input is 0, it represents the XY plane, when the input is 1, it represents the XZ plane, and when the value is 2, it represents the YZ plane. The pin direction represents the selection signal of clockwise or inverse circular interpolation, and if the value is 0, the inverse circular interpolation will be performed, if the value is 1, the clockwise interpolation will be performed. The pins A, V0, and VMAX are the pins of input quantities of the speed control module, respectively representing acceleration, initial velocity and maximum velocity. The pins X_reg, Y_reg and Z_reg represent the end positions of the three axes in linear interpolation, the pins Xs_reg, Ys_reg and Zs_reg represent the initial coordinate values of the three axes during arc interpolation, the pins Xe_reg, Ye_reg and Ze_reg respectively represent the terminal coordinate values of the three axes. The pins W_start and V_start control the movement of W and V rotation axes respectively, the pins W_fre and V_fre are the pins of the input frequency data, and the pins W_dir and V_dir represent the direction data of the two axes.

The speed control module is used for driving the lance to a target position through the first motors according to the action information, and changing the speed of the interpolation movement of the lance in the three-dimensional direction into a trapezoid acceleration and deceleration. In this embodiment, the speed control module is used for calculating the travel distance and travel time of each axial direction of the lance in the acceleration stage, uniform speed stage and deceleration stage according to the initial speed, the given feed speed, the acceleration and the feed distance, and then transmitting the corresponding travel information to each of the first motors, so that the first motors drive the lance to the target position according to the corresponding travel information.

Figure 3:
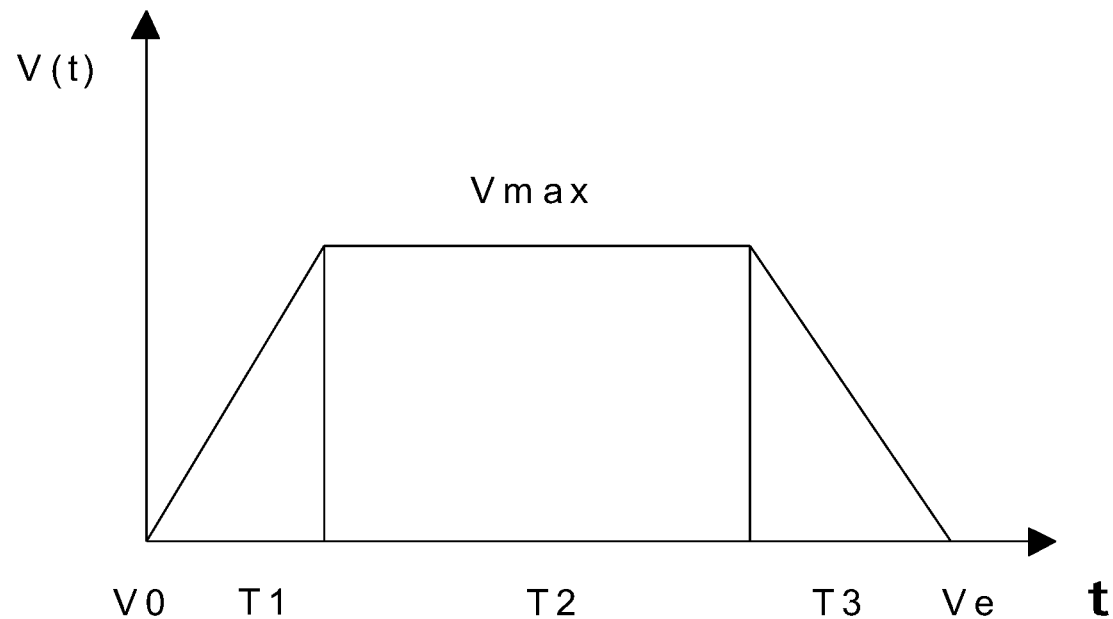
FIG. 3 is a diagram of the trapezoid acceleration and deceleration of the speed control module of the motion controller of the motion control system of FIG. 1.

Referring to FIG. 3, $V_0$ means the initial speed, $V_{max}$ means the given feed speed, $V_e$ means the final speed. $T_1$ means the acceleration time, $T_2$ means the uniform time, $T_3$ means the deceleration time, a means the acceleration. A means the acceleration, the change of velocity can be divided into accelerating, uniform and decelerating parts. The calculation formula of the travel speed of the lance is:

$$V(t) = \begin{cases} V_0 + at, t \in [0, t_1) \\ V_{max}, t \in [t_1, t2) \\ V_{max} - at, t \in [t_2, t_3) \end{cases}$$

Therefore, the calculation formula of the travel distance of the lance is:

$$L(t) = \begin{cases} V_0 t + \frac{1}{2}at^2, t \in [0, t_1) \\ L_1 + V_{max}t, t \in [t_1, t_2) \\ L_2 + V_{max}t - \frac{1}{2}at^2, t \in [t_2, t_3) \end{cases}$$

The calculation method of the feed distance includes: (1) calculating the total time of the lance in the acceleration stage, uniform speed stage and deceleration stage; (2) calculating the first product of the total time and the initial speed; (3) calculating the first square of the acceleration time in the acceleration stage, the second square of the deceleration time in the deceleration stage, the second product of the acceleration time and the deceleration time, and the third product of the acceleration time and the uniform time in the uniform speed stage; (4) accumulating the first square, twice the second product, and twice the third product, then subtracting the second square from the sum result; (5) calculating the third product of half the acceleration and the calculation result in step (4); and (6) accumulating the first product with the calculation result in step (5), and the addition result is equal to the feed distance. Therefore, the calculation formula of the feed distance is:

$$L = V_0(T_1 + T_2 + T_3) + \frac{a}{2}(T_1^2 + 2T_1 T_2 + 2T_1 T_3 - T_3^2)$$

Where, the acceleration time is equal to the deceleration time, and the calculation method of the acceleration time includes: (3.1) calculating the first difference between the given feed speed $V_m$ and the initial speed; and (3.2) calculating the first ratio of the first difference to the acceleration, and the first ratio is equal to the acceleration time. The acceleration distance and the deceleration distance are both equal to half the second ratio, the uniform distance is equal to the fourth difference between the feed distance and the second ratio. Therefore, the calculation formulas of the time in the acceleration stage, uniform speed stage and deceleration stage are:

$$T_3 = T_1 = \frac{1}{a}(V_{max} - V_0)$$

$$T_2 = \frac{1}{V_{max}}\left(L - \frac{V_{max}^2 - V_0^2}{a}\right)$$

The calculation method of the uniform time includes: (3.3) calculating the third square of the given feed speed and the fourth square of the initial speed, then calculating the second difference between the third square and the fourth square; (3.4) calculating the second ratio of the second difference to the acceleration; (3.5) calculating the third difference between the feed distance and the second ratio; and (3.6) calculating the third ratio of the third difference to the given feed speed, and the third ratio is equal to the uniform time. Therefore, the calculation formulas of the travel distance in the acceleration stage, uniform speed stage and deceleration stage are:

$$L_1 = L_3 = \frac{V_{max}^2 - V_0^2}{2a}$$

$$L_2 = L - \frac{V_{max}^2 - V_0^2}{a}$$

Where, $L_1$ means the travel distance in the acceleration stage, $L_2$ means the travel distance in the uniform speed stage, $L_3$ means the travel distance in the deceleration stage.

Figure 4:
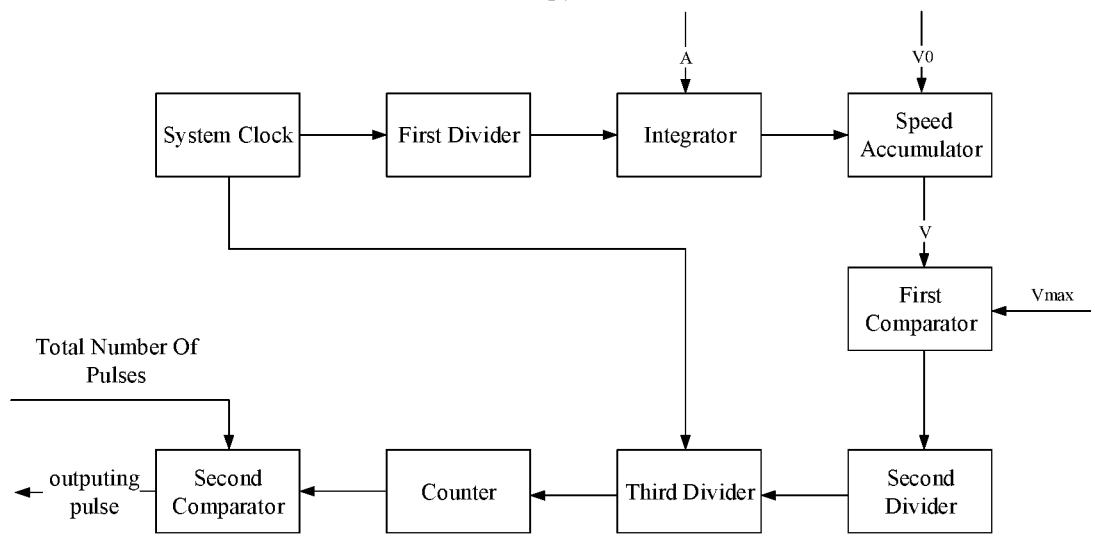
FIG. 4 is a system block diagram of the speed control module of the motion controller of the motion control system of FIG. 1.
Figure 5:
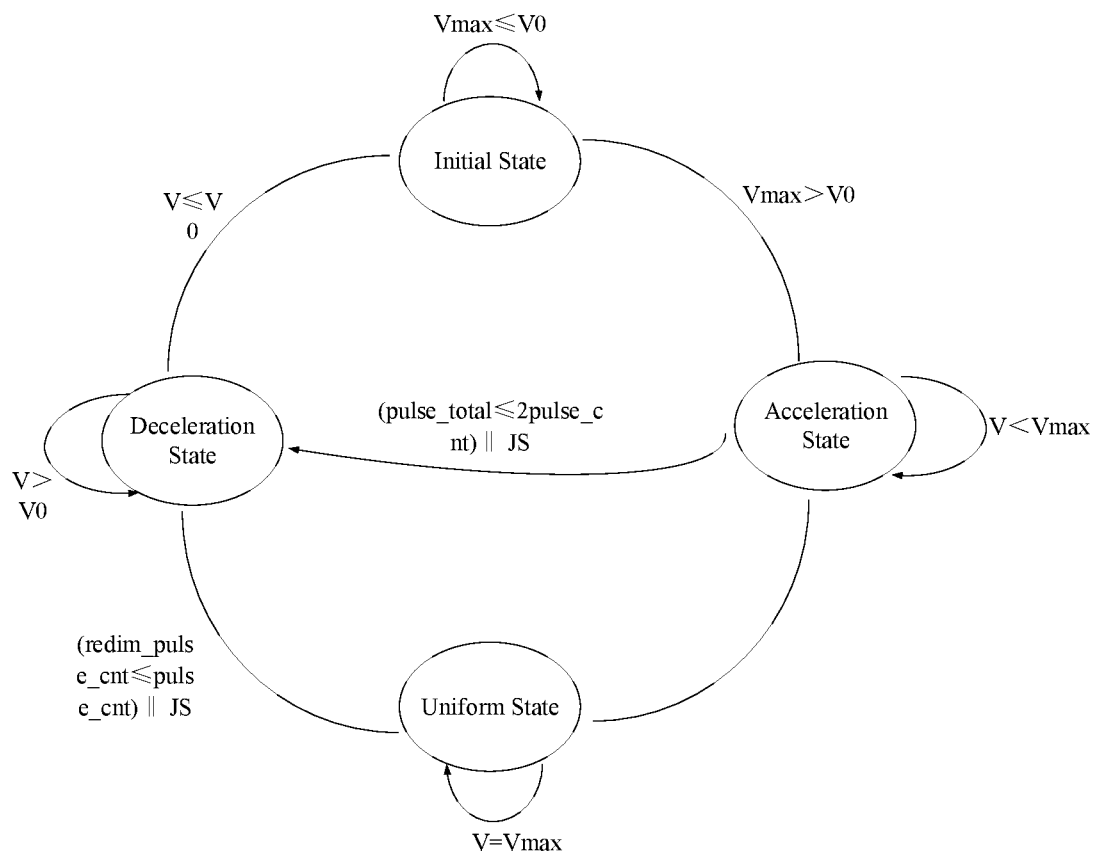
FIG. 5 is a diagram of the changing speed of the lance which driven by the motion controller of the motion control system of FIG. 1.

Referring to FIGS. 4 and 5, in this embodiment, the speed control module includes a first divider, an integrator, a speed accumulator, a first comparator, a second divider, a third divider, a counter and a second comparator. The first divider is used for dividing the frequency of the generated system clock to generate a sampling pulse. The period of the sampling pulse is T, the input system clock is 50 MHz, and the frequency of division coefficient is 1000, so the frequency after the clock frequency division is 5×104 Hz. The integrator is used for multiply the sampling pulse with the given feed speed to obtain a speed increment, the speed increment is equal to AT. The speed accumulator is used for accumulating the initial speed with the speed increment to obtain the real-time speed of the lance, and the calculation formula is V=V0+AT. The first comparator is used for comparing the real-time speed and the given feed speed. The second divider is used for calculating the clock frequency according to the frequency of an output pulse when the real-time speed is less than the given feed speed, and the calculation formula is N=clk/f. The third divider is used for dividing the clock frequency N and generating acc pluse an_output pulse for driving the first motors to accelerate. The counter is used for counting the output pulse acc_pluse and generating a count value Pulse_cnt. The second comparator is used for comparing twice the count value Pulse_cnt and a preset total number of pulses Pulse total. When the total number Pulse total is no more than twice the count value Pulse_cnt, the motion controller is used for slowing down the lance through the first motors.

The system is in the initial state when it is just started, when the given feed speed $V_{max}$ is set, the lance will enter the acceleration stage, otherwise, the lance will remain unchanged. In the acceleration process, when the speed V in the accumulator accumulates continuously until it reaches the speed $V_{max}$, and the total number Pulse_total is greater than twice the count value Pulse_cnt, it enters the uniform speed state. If the total number Pulse_total is less than twice the count value Pulse_cnt, the deceleration phase is entered. JS is as a deceleration signal, when it is inputted, the system will directly start to decelerate, otherwise keep accelerating. In the uniform process, the system always outputs pulses at the speed $V_{max}$ to the interpolation module. The number of remaining pulses redim_Pulse_cnt is equal to the result of the total number of pulses minus the number of pulses output in the accelerated state, until the number of remaining pulses is less than or equal to the number of output pulses, the system enters the deceleration phase. In the decelerating process, the current speed V is reduced all the way to the beginning state, and an acceleration and deceleration cycle is completed, otherwise, the deceleration is still performed.

Figure 6:
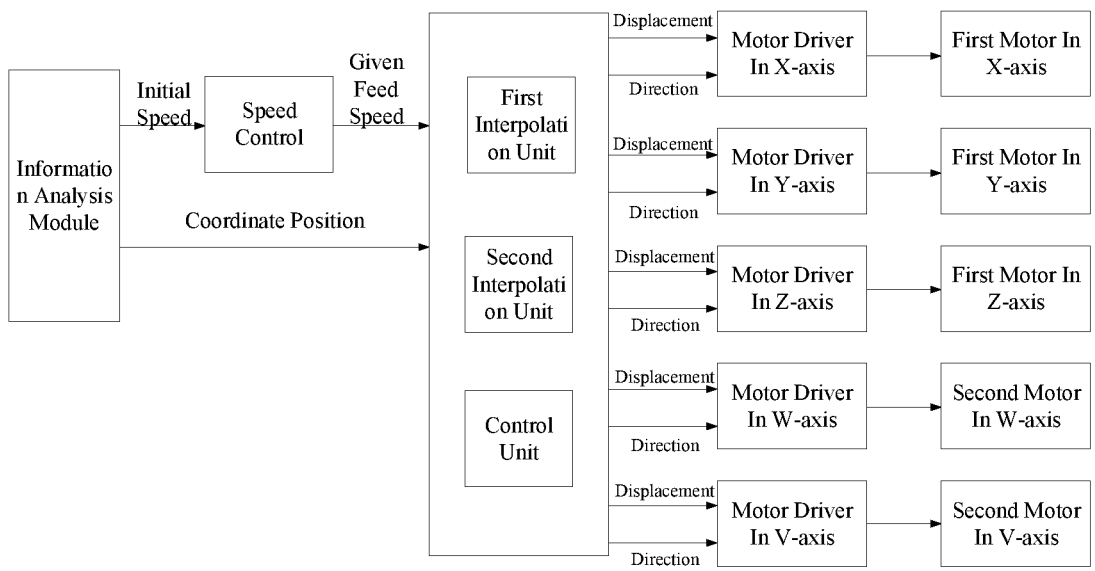
FIG. 6 is a system block diagram of the interpolation module of the motion controller of the motion control system of FIG. 1.

Referring to FIG. 6, the interpolation module includes a first interpolation unit, a second interpolation unit and a control unit. The first interpolation unit is used for storing the displacement in the direction of each dimension in the corresponding register, and accumulating the displacement in the corresponding interpolation accumulator at intervals of a preset time interval. And the overflow pulse generated by each accumulation in the corresponding interpolation accumulator is used as an impulse equivalent to drive the corresponding first motor for linear interpolation. The second interpolation unit is used for storing the initial values of two axes in the registers corresponding to the other axis, and accumulating in two interpolation accumulators corresponding to the two axes respectively. And the overflow pulse generated by each accumulation in each interpolation accumulator is used as an equivalent pulse to drive the first motor corresponding to another axis for circular interpolation. The control unit is used for rotating the clamp or the lance to reach a specified position by driving the corresponding second motor, according to the rotation information.

Figure 7:
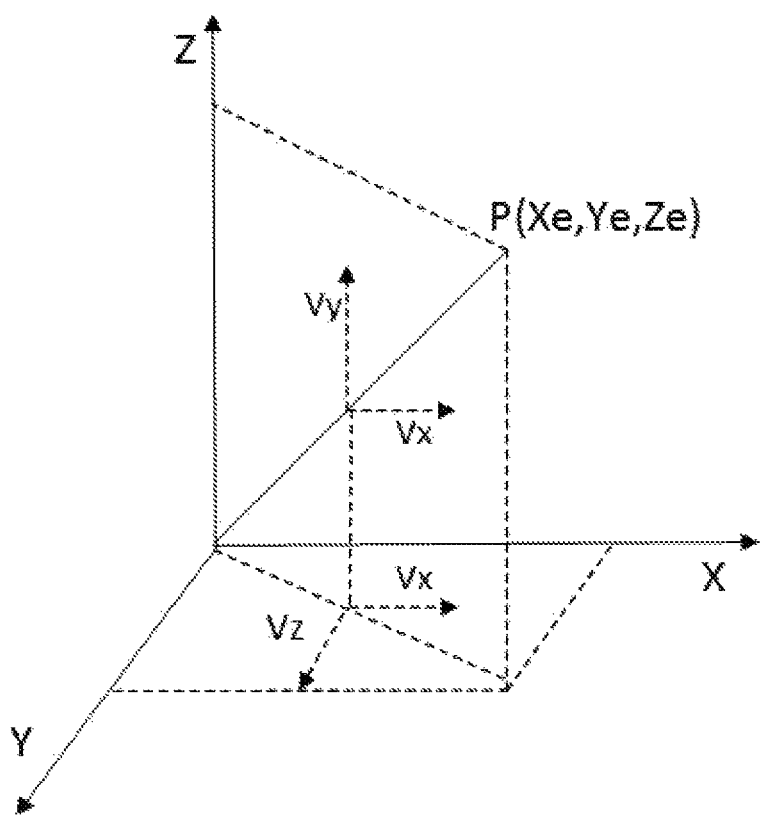
FIG. 7 is a diagram for linear interpolation of the first interpolation unit of the interpolation module of FIG. 6.

Referring to FIG. 7, the initial position of the lance is defined as the original point O, and the coordinate of the final position of the lance is $(x_e, y_e, z_e)$. If the lance moves along line OP with the speed V, V can be decomposed into three velocities $V_x$, $V_y$ and $V_z$, of the moving point in the direction of X, Y and Z axes. In a time $\Delta t$, the displacement increment along the X, Y and Z axes is calculated by:

$$\begin{cases} \Delta x = V_x \Delta t \\ \Delta y = V_y \Delta t \\ \Delta z = V_z \Delta t \end{cases}$$

The length of line OP is defined as l, so that $$\frac{V}{l} = \frac{V_x}{x_e} = \frac{V_y}{y_e} = \frac{V_z}{z_e} = k,$$

k is a constant. The changes in displacement of the axes are:

$$\begin{cases} \Delta x = k x_e \Delta t \\ \Delta y = k y_e \Delta t \\ \Delta z = k z_e \Delta t \end{cases}$$

If $\Delta t$ is equal to 1, the displacement of the lance in the X-axis direction is equal to the product of a constant, the accumulated times of interpolation accumulator, and the coordinate value $x_e$. The displacement of the lance in the Y-axis direction is equal to the product of the constant, the accumulated times, and the coordinate value $y_e$. The displacement of the lance in the Z-axis direction is equal to the product of the constant, the accumulated times, and the coordinate value $z_e$. Therefore, the calculation formula of the displacement in the three-dimensional direction is:

$$\begin{cases} x = \int_0^t k x_e dt = k n x_e \\ y = \int_0^t k y_e dt = k n y_e \\ z = \int_0^t k z_e dt = k n z_e \end{cases}$$

The product of the constant and the accumulated times is equal to 1. When processing line OP, the endpoint coordinates $x_e$, $y_e$ and $z_e$ are firstly reduced to $kx_e$, $ky_e$ and $kz_e$, then the coordinate value matching the line should be accumulated for several times. For the value of k, increment $\Delta x$, $\Delta y$ and $\Delta z$ should be less than 1, so that there is no feed pulse number greater than 1 on each axis, namely:

$$\begin{cases} \Delta x = k x_e < 1 \\ \Delta y = k y_e < 1 \\ \Delta z = k z_e < 1 \end{cases}$$

When the register is an m bit register, and the maximum capacity is equal to the difference between two to the power of m and 1, namely: $2^m - 1$, $$k < \frac{1}{2^m - 1}.$$

The accumulated times is equal to two to the power of m, namely: $n = 2^m$, $$k = \frac{1}{2^m}.$$

Figure 8:
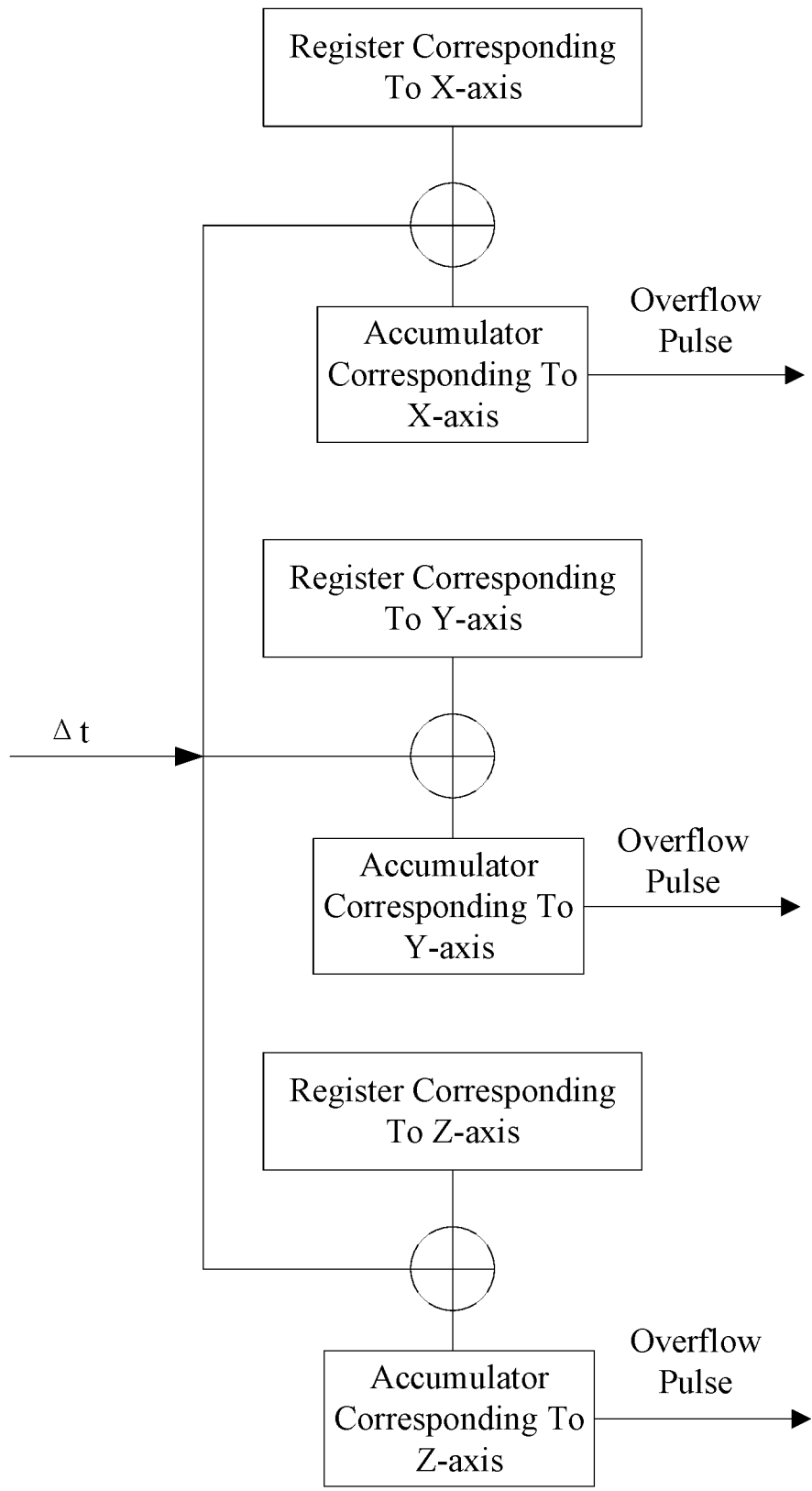
FIG. 8 is a linear interpolation block diagram of the interpolation module of FIG. 6.

Referring to FIG. 8, these calculations are all done in binary, and to multiply something by $$\frac{1}{2^m},$$

just keeping the number the same and move it to the left by m bits. Therefore, in the case of linear interpolation, $x_e$, $y_e$ and $z_e$ can be stored in their respective registers, and then they can be calculated separately at every time interval $\Delta t$. Each time the accumulator overflows, the motor on the corresponding axis will be driven to move one pulse equivalent. If we add $2^m$ times to $$\frac{1}{2^m} x_e, \frac{1}{2^m} y_e \text{ and } \frac{1}{2^m} z_e,$$

the total number of times added is also the number of pulse overflow, and the motion of the three axes also reaches the end point.

In this embodiment, the input of the linear interpolation unit includes the clock clk, the reset signal rstn, and the quadrant_value is the quadrant value. When the value is 0, the first quadrant interpolation is performed. When the value is 1, the second quadrant interpolation is performed; and so on. When the value is 7, the eighth quadrant interpolation is performed. X_reg, Y_reg and Z_reg respectively store the initial values of X, Y and Z axes. When the start signal comes, the accumulative registers of the three axes X_acc_reg, Y_acc_reg and Z_acc_reg start to accumulate. When the counter pulse_Cnt is full, the overflow pulse X_pulse, Y_pulse and Z_pulse drives the motor movement of each axis. According to the different control motor interpolation quadrant forward or reverse. Busy signal, whose value equals 1 means that the line interpolation is executed, and whose value equals 0 means that the interpolation ends.

The output of the three-axis direction pulse corresponding to each quadrant interpolation is shown in Table. 1. Positive output represents positive rotation of the motor, while negative output represents motor reversal.

TABLE 1 different quadrant interpolation axis feed direction table

|  | first quadrant | second quadrant | third quadrant | fourth quadrant | fifth quadrant | sixth quadrant | seventh quadrant | eighth quadrant |
|---|---|---|---|---|---|---|---|---|
| X-axis | +X | −X | −X | +X | +X | −X | −X | −X |
| Y-axis | +Y | +Y | −Y | −Y | +Y | +Y | −Y | +Y |
| Z-axis | +Z | +Z | +Z | +Z | −Z | −Z | −Z | +Z |

Figure 9:
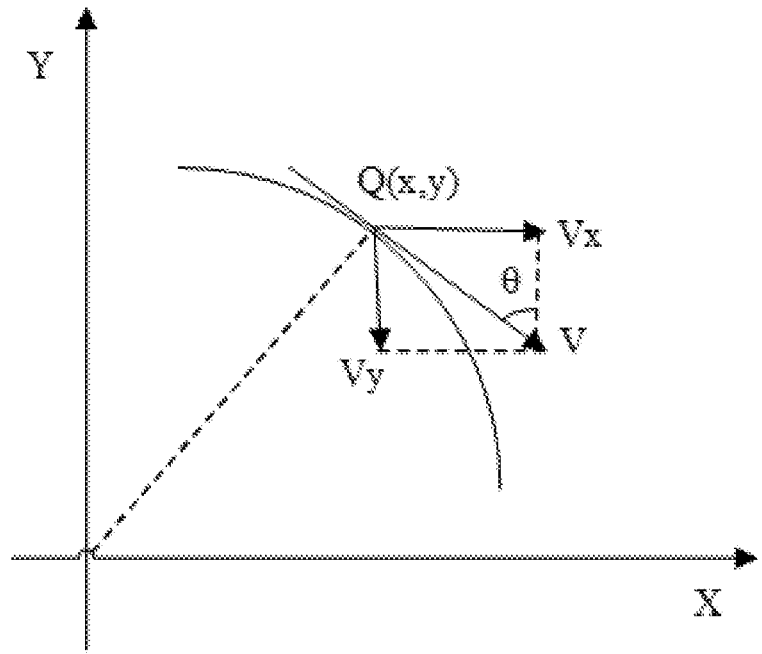
FIG. 9 is a diagram for circular interpolation of the second interpolation unit of the interpolation module of FIG. 6.

Referring to FIG. 9, in the two-dimensional plane formed by the X-axis and Y-axis, the velocity of a point along the circle Q(x,y) in the first quadrant is the speed V. Its partial velocity $V_x$ in the X-axis direction and the partial velocity $V_y$ in the Y-axis direction can be expressed as follows:

$$\begin{cases} V_x = V \sin\theta \\ V_y = V \cos\theta \end{cases}$$

Wherein, $$\sin\theta = \frac{y}{r}, \cos\theta = \frac{x}{r},$$

so that the relationship of the speed of the point A and the displacement is:

$$\frac{V}{r} = \frac{V_x}{y} = \frac{V_y}{x} = k.$$

From the above equation, we can get:

$$\begin{cases} V_x = \frac{dx_i}{dt} = V \sin\theta = rk \sin\theta = ky_i \\ V_y = \frac{dy_i}{dt} = -V \cos\theta = -rk \sin\theta = -kx_i \end{cases}$$

Corresponding to the time increment, the displacement increment on the coordinates x and y can be expressed as $$\begin{cases} \Delta x_i = ky_i \Delta t \\ \Delta y_i = -kx_i \Delta t \end{cases}.$$

The accumulator has the same capacity as the register, so the calculation formula of the displacement of the lance which driven by the second interpolation unit is:

$$\begin{cases} x = \int_0^t ky\,dt = \frac{1}{2^m} \sum_{i=1}^n y_i \Delta t \\ y = \int_0^t -kx\,dt = -\frac{1}{2^m} \sum_{i=1}^n x_i \Delta t \end{cases}$$

Similarly, in the two-dimensional plane formed by the X-axis and Z-axis, the calculation formula of the displacement of the lance which driven by the second interpolation unit is:

$$\begin{cases} x = \int_0^t kz\,dt = \frac{1}{2^m} \sum_{i=1}^n z_i \Delta t \\ z = \int_0^t -kx\,dt = -\frac{1}{2^m} \sum_{i=1}^n x_i \Delta t \end{cases}$$

Figure 10:
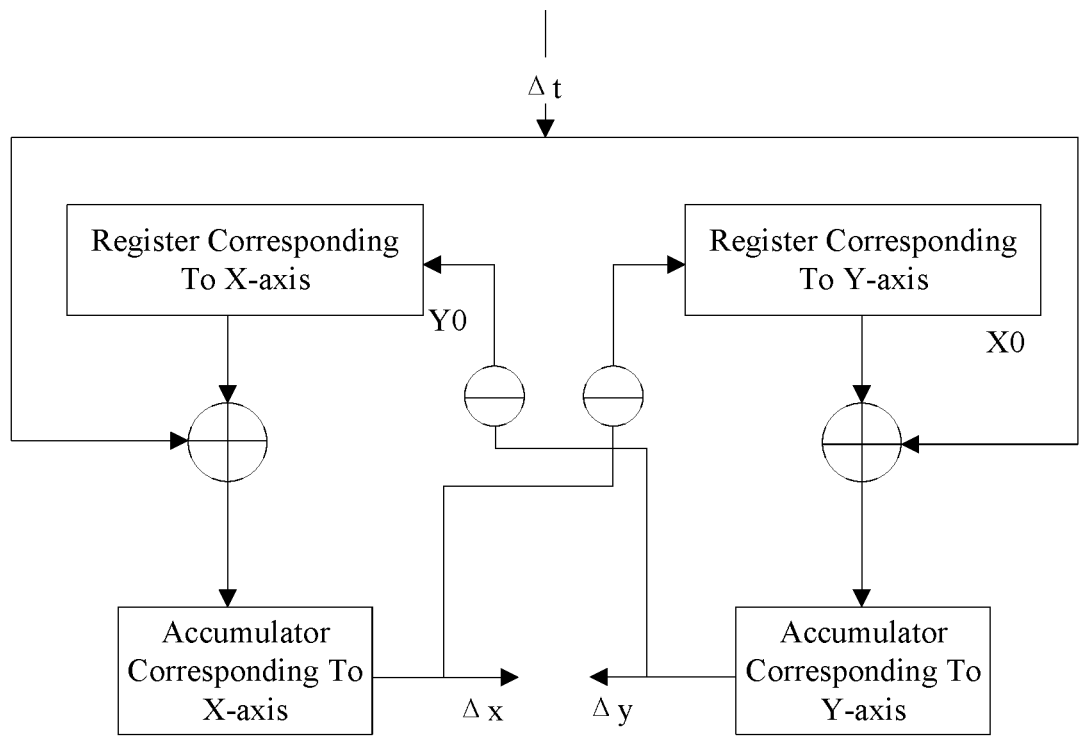
FIG. 10 is a circular interpolation block diagram of the interpolation module of FIG. 6.

Referring to FIG. 10, the initial value XO of X-axis and the initial value YO of Y-axis are placed in the corresponding registers, each time a control pulse is sent out, the two initial values are accumulated to the corresponding accumulator respectively. The overflow pulse of X-axis is used for driving the motor corresponding to Y-axis in the negative direction, the overflow pulse of Y-axis is used for driving the motor corresponding to X-axis in the positive direction. At the same time, the register value corresponding to the X-axis should be reduced by 1 if the Y direction overflows an impulse. Coordinate values are continuously corrected so that the stored initial values are also updated when the position is updated until the end of interpolation. The implementation principle of circular interpolation in the other two planes is the same, except that the feed direction of each coordinate axis and the correction of register contents are different.

In circular interpolation, if there is a problem in the judgment of the end point, this module cannot work normally, and in serious cases, it will cause damage to the spraying machine performing interpolation. The judgment of the end point of circular interpolation is different from that of linear interpolation, which depends on whether the sum of the steps along the axes X and Y is consistent with the total number of steps to reach the end point. In this embodiment, two counters X_total and Y_total are used to store the distance between the end point of the two axes and the initial point respectively. If the number of steps reaches the maximum number |Xe−Xs|+|Ye−Ys|, the interpolation will be ended. In addition, a half-loading method is also used to reduce errors and improve interpolation accuracy. In the process of interpolation, the correction of integrand and feed direction should be determined according to the quadrant where the arc is located and the direction of the arc. Taking the XY plane as an example, the interpolation correction parameters of each quadrant are shown in Table. 2.

TABLE 2 interpolation correction parameter table

|  | Along the arc | | | | Inverse the arc | | | |
| --- | --- | --- | --- | --- | --- | --- | --- | --- |
| Quadrant | 1 | 2 | 3 | 4 | 5 | 6 | 7 | 8 |
| Direction of feed in X-axis | $+\Delta x$ | $+\Delta x$ | $-\Delta x$ | $-\Delta x$ | $-\Delta x$ | $-\Delta x$ | $+\Delta x$ | $+\Delta x$ |
| Direction of feed in Y-axis | $-\Delta y$ | $+\Delta y$ | $+\Delta y$ | $-\Delta y$ | $+\Delta y$ | $-\Delta y$ | $-\Delta y$ | $+\Delta y$ |
| Correction of the integrand JVx | − | + | − | + | + | − | + | − |
| Correction of the integrand JVy | + | − | + | − | − | + | − | + |

The interaction module includes a keying circuit, a keying judgment unit and a display circuit. The keying circuit has a plurality of keypad switches arranged in a matrix; the keypad switches in each line are connected at one end and the connected ends are formed as a line output end, the keypad switches in each column are connected at the other end and the other connected ends are formed as a column output end. The keying judgment unit is used for determining the on-off state of the keypad switches according to the state changings of the line output ends and the column output ends, and transmitting the corresponding state information. The display circuit is used for displaying the on-off state according to the keying judgment unit. The keying judgment unit is used for transmitting the state information to the primary processor and the display circuit; the primary processor generates the motion information according to the state information.

The motion control system of spraying machine is in the vibration environment, this may lead to the output of the power supply voltage is not stable, and reliable power supply is the precondition of the whole control system can work stable, and small volume of power supply module is advantageous to the circuit wiring and save the development costs of circuit board, so the design of the power module in the system hardware plays an important role. The input voltage of motion controller is 24V, the work voltage of peripheral circuits is 5V, the work voltage of the port I/O is 3.3V, the kernel operating voltage of the FPGA chip is 1.2V.

Figure 11:
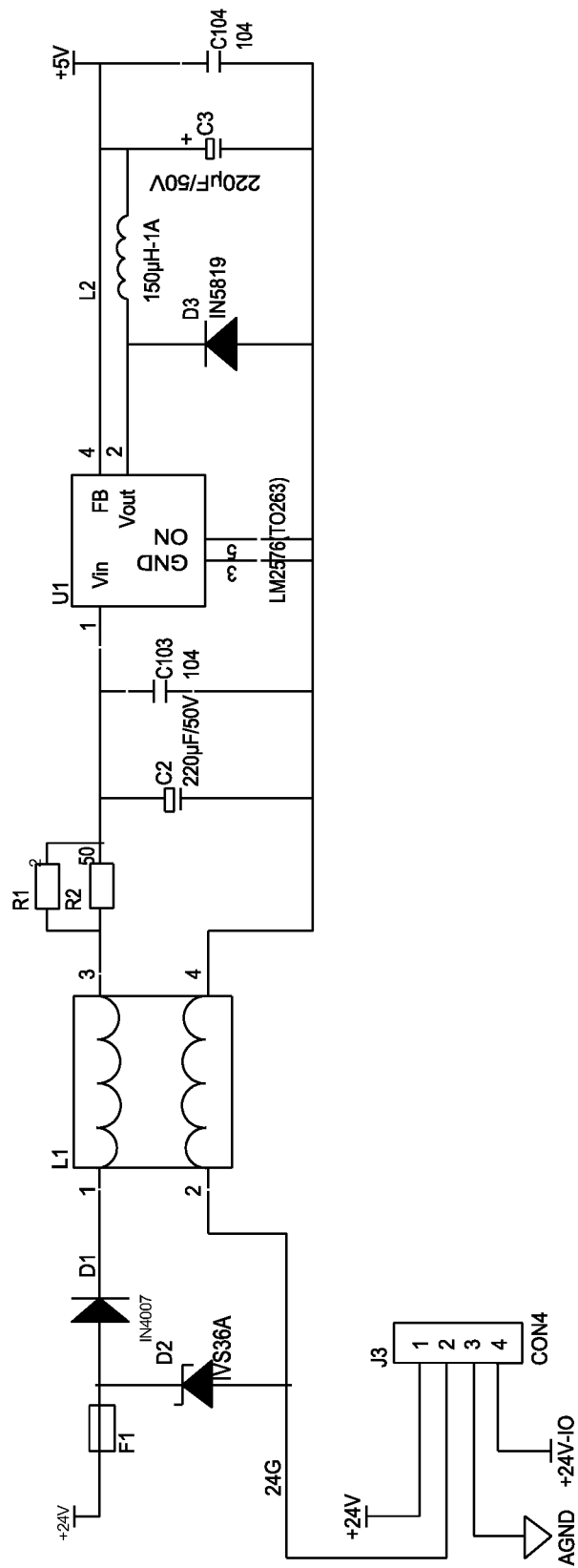
FIG. 11 is a circuit diagram of the first voltage conversion circuit of the power module of the motion controller of the motion control system of FIG. 1.

Referring to FIG. 11, the power module includes a first voltage conversion circuit, a second voltage conversion circuit and a third voltage conversion circuit. The first voltage conversion circuit is used for converting an external input voltage of 24V to a voltage of 5V. The voltage conversion chip of the first voltage conversion circuit is a chip of LM 2576 S, and supports USB power input. The first voltage conversion circuit uses the diodes to realize the over-current protection function, to prevent the voltage reversal, and adds inductance and capacitance for filtering and decoupling, to filter out the interference, and to prevent the voltage fluctuation from affecting the system work.

Figure 12:
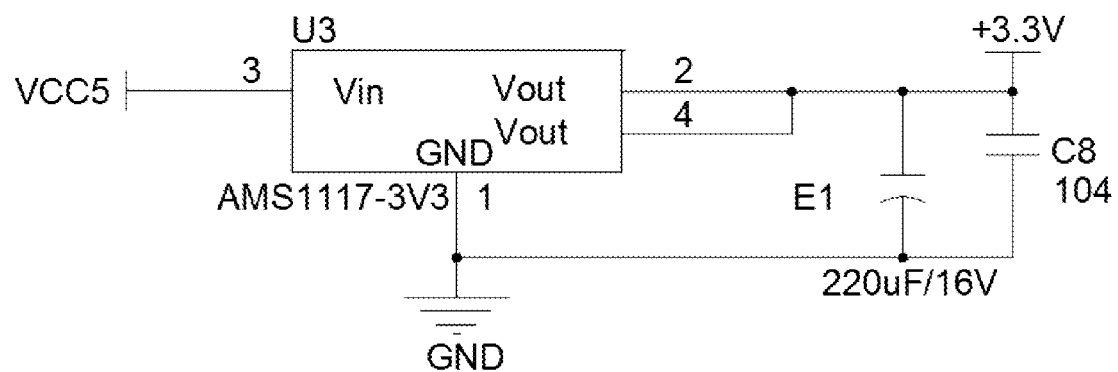
FIG. 12 is a circuit diagram of the second voltage conversion circuit of the power module of the motion controller of the motion control system of FIG. 1.
Figure 13:
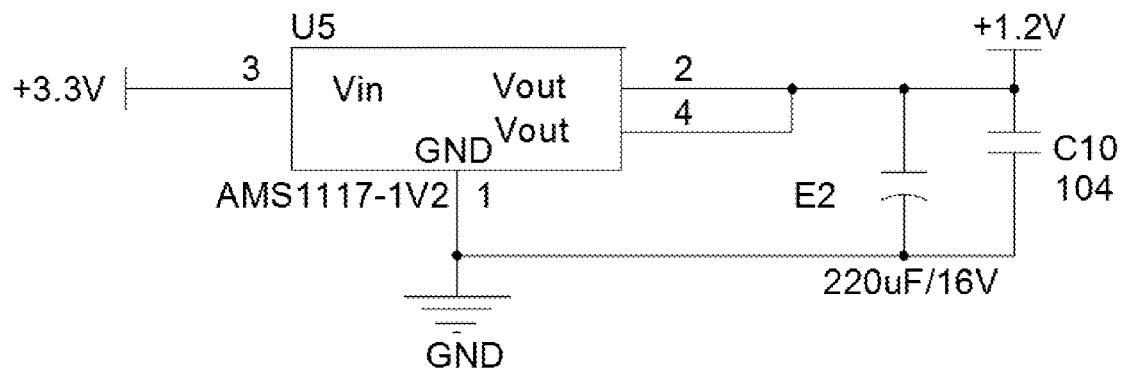
FIG. 13 is a circuit diagram of the third voltage conversion circuit of the power module of the motion controller of the motion control system of FIG. 1.

Referring to FIGS. 12 and 13, the second voltage conversion circuit is used for converting the voltage of 5V to a voltage of 3.3V. The voltage regulator chip of the second voltage conversion circuit is a chip of AMS1117-3.3. In order to improve the quality of power supply and eliminate the influence of noise on the system, two capacitors are added to the output to reduce the influence of power disturbance and high-frequency noise on the whole circuit. The maximum output current of power supply circuit with 1.2V is 800 mA. The third voltage conversion circuit is used for converting the voltage of 3.3V to a voltage of 1.2V.

Figure 14:
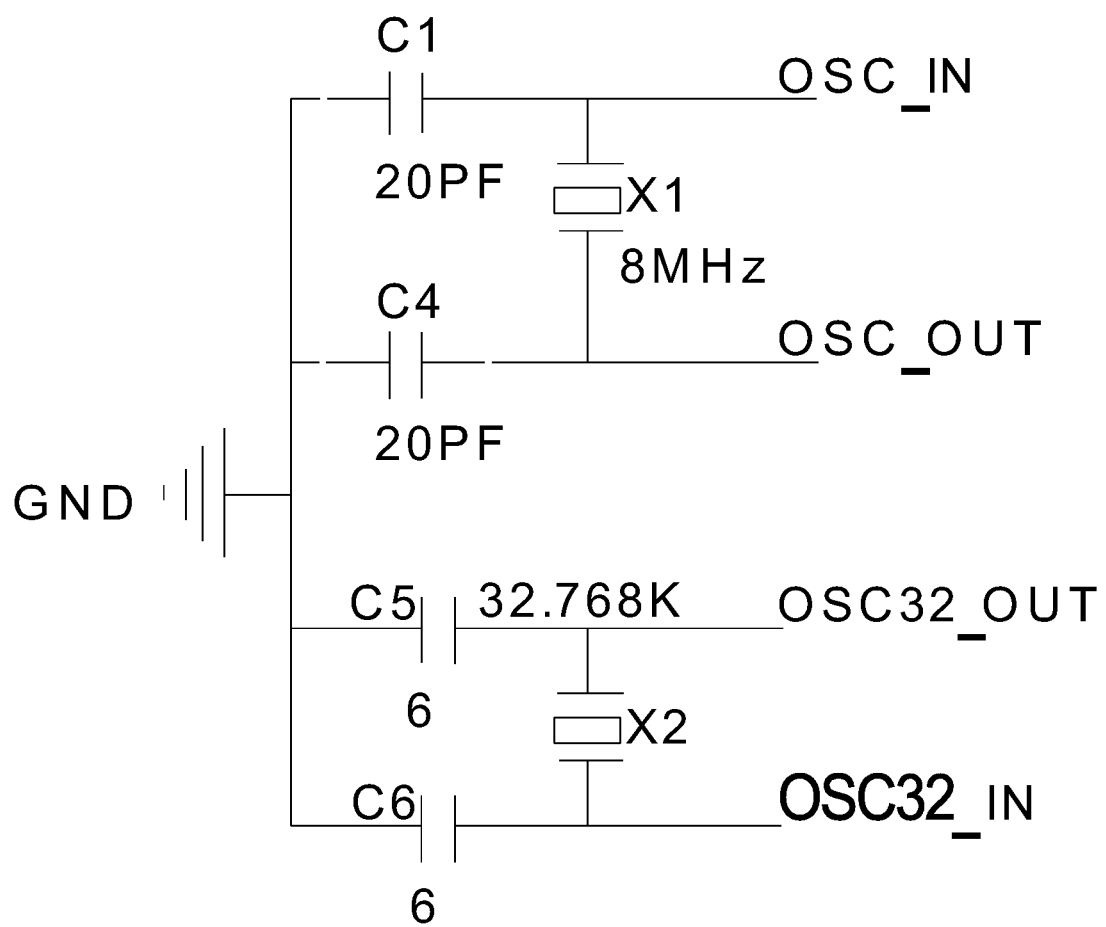
FIG. 14 is a clock circuit diagram of the peripheral circuits of the motion control system of FIG. 1.
Figure 15:
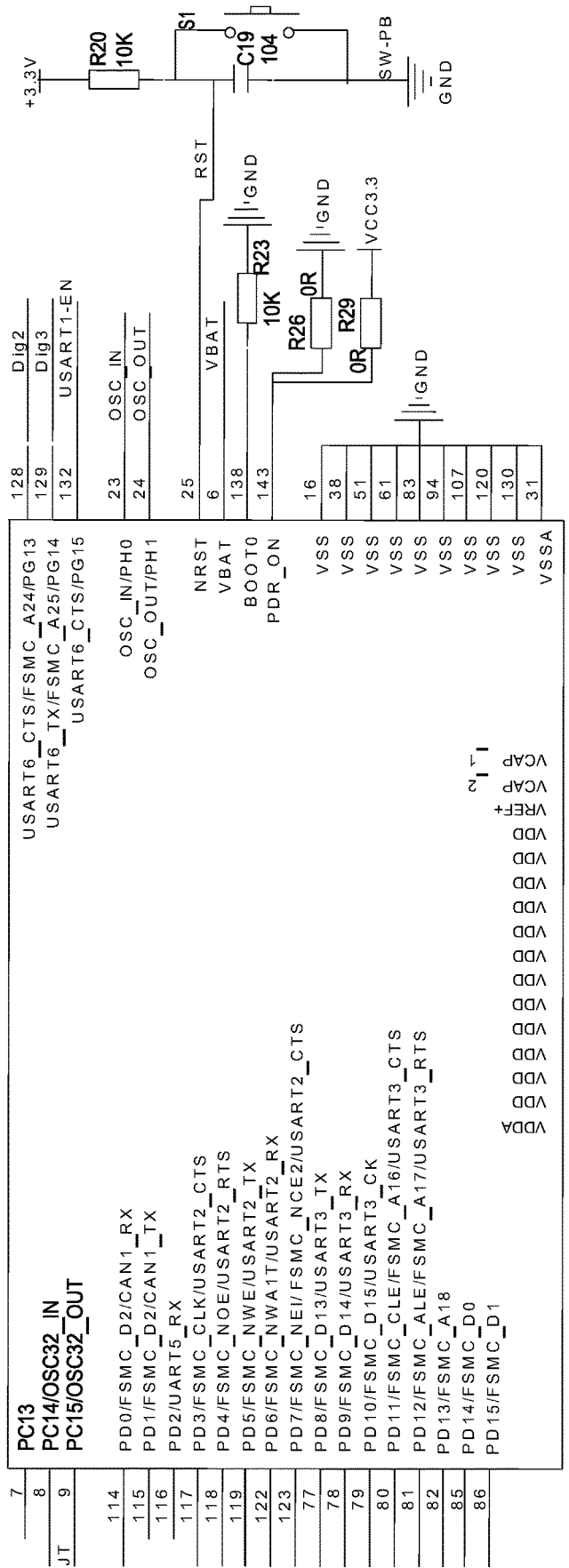
FIG. 15 is a recovery circuit diagram of the peripheral circuits of the motion control system of FIG. 1.

Referring to FIGS. 14 and 15, the main function of the crystal oscillator of the clock and recovery circuit is to supply the reference frequency. In this embodiment, 8 MHz crystal oscillator is used to generate the working clock of the main processor, and 32.768 KHz high frequency crystal oscillator is used to generate the real-time clock capable of timing. The system needs a stable reset circuit to work normally, so that connecting the reset pin on STM32 to the 3.3V power supply through 10K resistance. When the reset button is pressed, the system will respond to the reset signal to reset.

Figure 16:
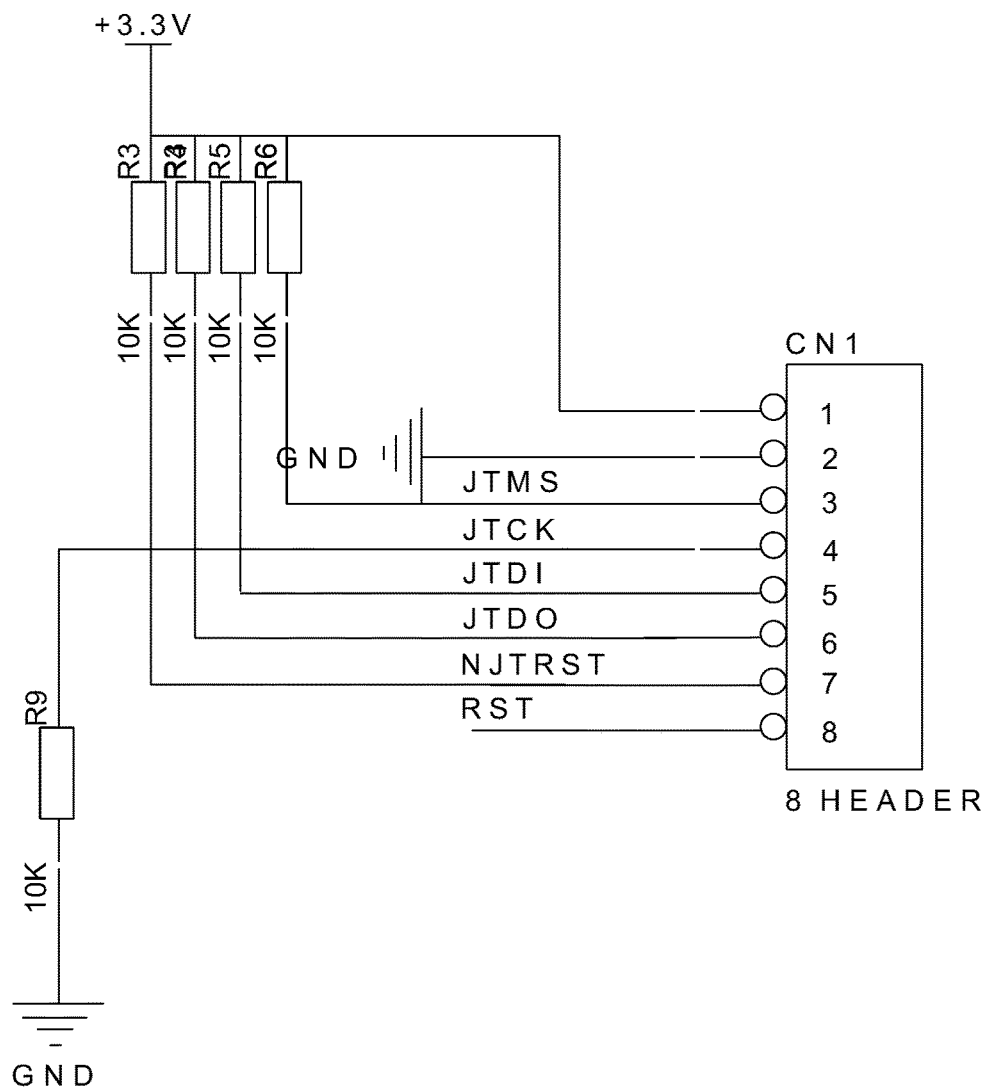
FIG. 16 is a download circuit diagram of the peripheral circuits of the motion control system of FIG. 1.

Referring to FIG. 16, the interface connection of the download circuit is shown. JTAG is a standard test protocol. By using the simulator to connect to the JTAG interface, the bus and port IO in the chip can be accessed to realize connection debugging. Standard JTAG configuration interface includes: data input TDI, data output TDO, state machine mode control pin TMS, clock TCK, system reset signal nTRST, low level effective. When TCK is to pull down the connection ground, TMS, TDI and TDO are pulled up by a resistor of 10K according to the standard IEEE 1149.1, which can ensure the data edge with good driving ability.

Figure 17:
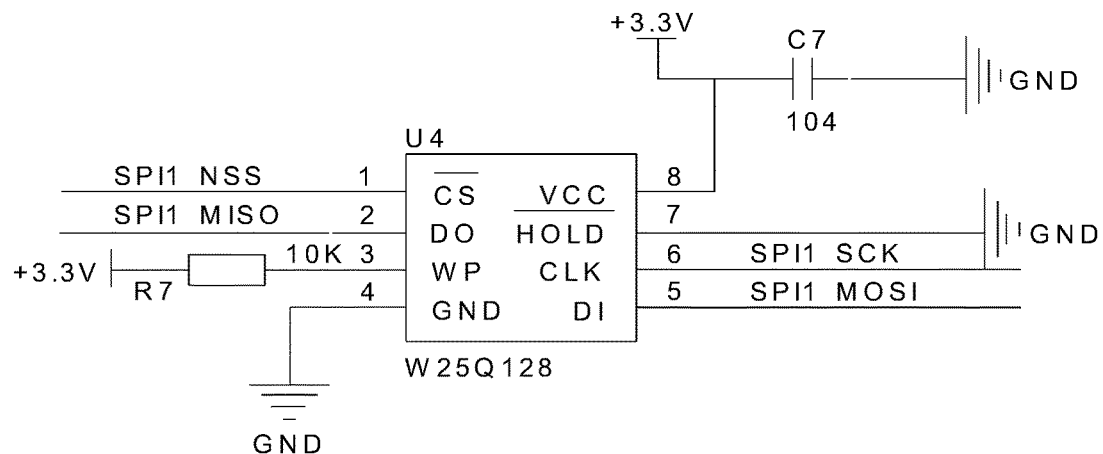
FIG. 17 is a bus interface circuit diagram of the peripheral circuits of the motion control system of FIG. 1.

Referring to FIG. 17, SPI bus is used for communication between STM32 and FPGA. SPI is fully called serial peripheral interface and is a high-speed full-duplex communication bus, so the bus interface circuit is shown. With a capacity of 128 Mb, it is more flexible and has better performance than ordinary serial memory and can provide data to RAM immediately. SPI contains four buses, among which SCK is clock signal generated by host STM32, NSS signal represents chip selection of slave FPGA, MOSI is data output by STM32, and MISO is data returned by FPGA. When the chip selection signal output is low, MOSI and MISO signals are valid and send one bit of data per clock cycle. Signal WP is the write protection input. When the value is zero, the write protection is turned on and data cannot be written into the chip. When STM32 and FPGA need to conduct data interaction, they need to use their serial registers for temporary data storage before sending through their respective data input signals.

Figure 18:
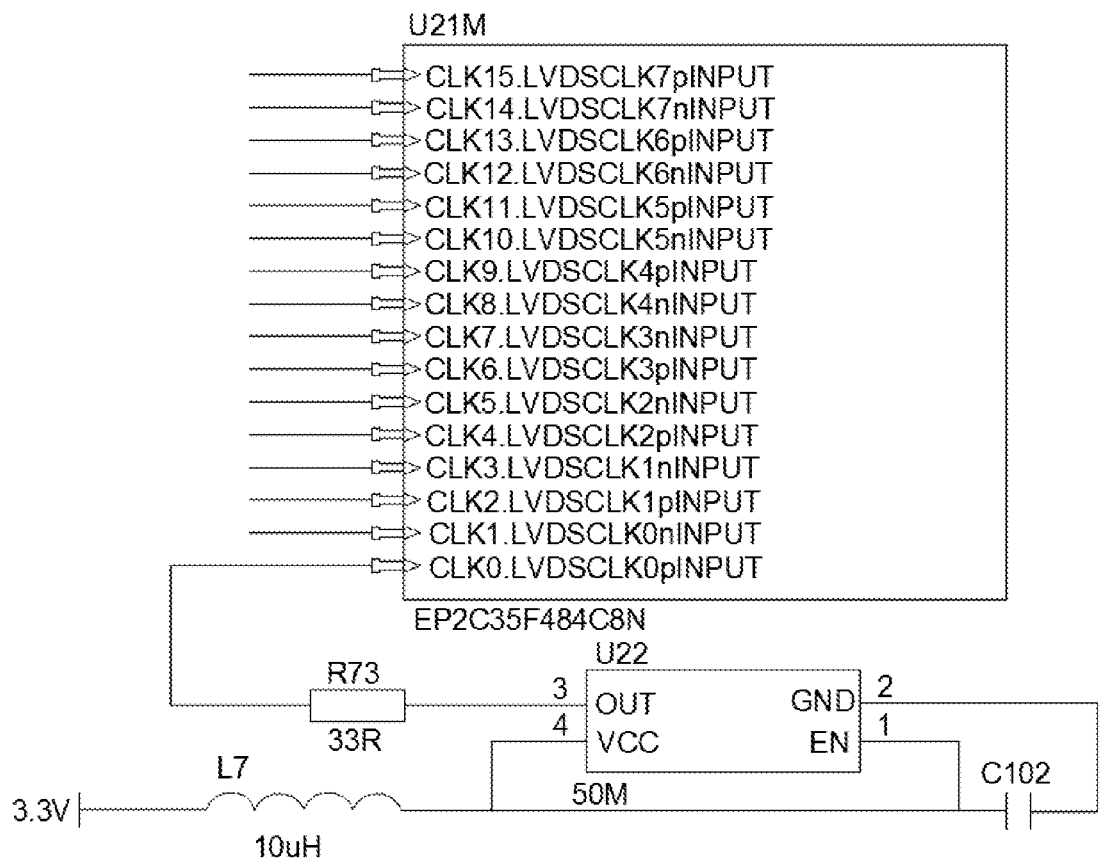
FIG. 18 is a clock circuit diagram of FPGA chip of the motion controller of the motion control system of FIG. 1.

Referring to FIG. 18, the clock circuit of the chip of EP2C35F484C8N is shown. The added resistance in the circuit can optimize the crystal oscillator output, and the capacitor 104 is mainly used for decoupling. The negative effects of power disturbances should also be considered, so add magnetic beads to mitigate this effect. The configuration circuit is shown in the figure. The EP2C35 series chips support JTAG configuration and AS active configuration. With JTAG configuration, JTAG interface and Quartus II software can be used for downloading. The AS configuration circuit must be matched with the configuration chip, and the signal in total includes seven kinds of chip selection control nCS, data output DATA, active control input ASDI, input clock DCLK and nCE, CONFIG-DONE, and nCONFIG. The signals CONFIG-DONE and nCONFIG are connected to the 3.3V power supply through 10K resistance and nCE grounded through 10K resistance to ensure that whether the configuration pin is in JTAG configuration or in normal use, the level output is correct.

In the motion controller, displacement and direction pulses of each axis are output by interpolation and rotation control modules. After all pulse signals are converted into differential signals by the conversion chip, they are output to the motor driver, and then the stepping motor is controlled to operate in accordance with the instructions. The function of difference is to determine the signal value according to the voltage difference, which can effectively suppress electro-magnetic and other external interference. Compared with the traditional interface I/O, differential signal transmission has the advantages of fast speed, low power consumption and low price. Therefore, in the motion control system, the pulse signal, direction signal and more signals are used differential signal, so as to improve the anti-interference ability of the system.

Figure 19:
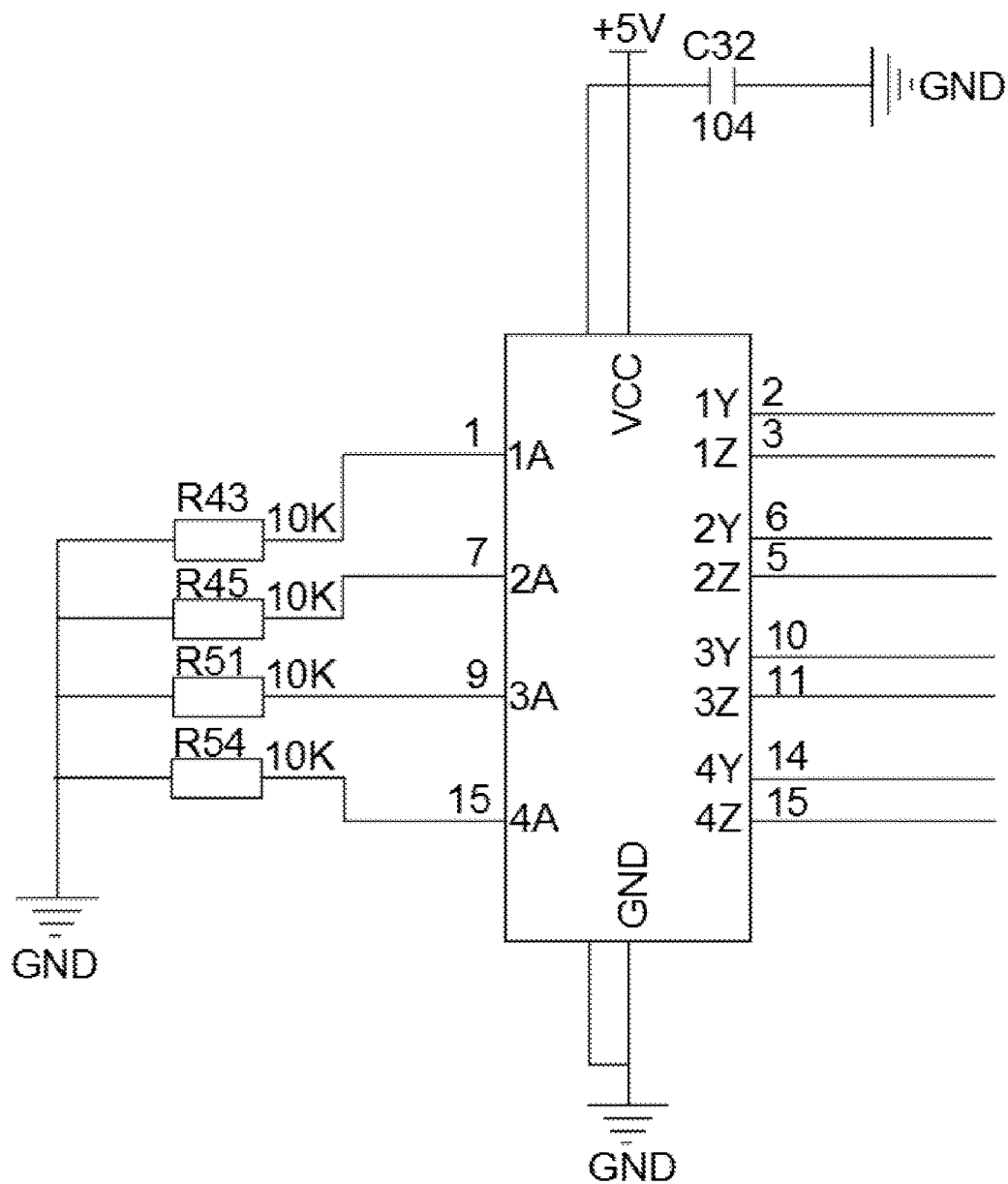
FIG. 19 is a diagram of the driving circuit for motors of the peripheral circuits of the motion control system of FIG. 1.

Referring to FIG. 19, differential signal conversion chip AM26LS31 is used to realize differential signal output in the motor drive circuit. The direction signal and displacement signal of the axes X, Y, Z, W and V are converted into differential output mode respectively, and then connected to the motor driver through the wiring terminal of the output end to control the motor to move.

Figure 20:
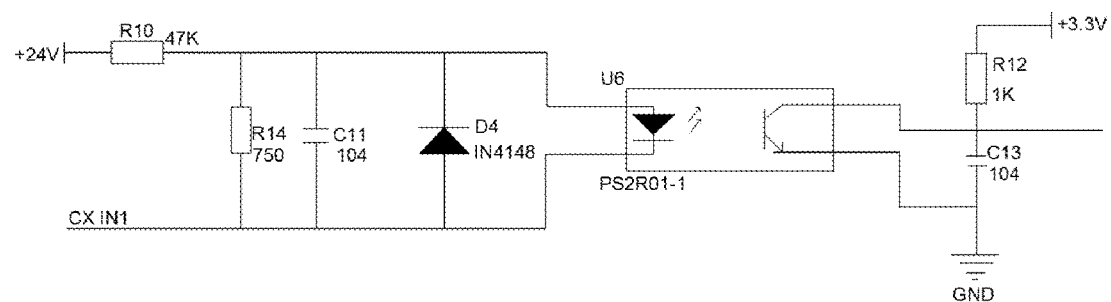
FIG. 20 is a diagram of the isolation circuit for input of the peripheral circuits of the motion control system of FIG. 1.
Figure 21:
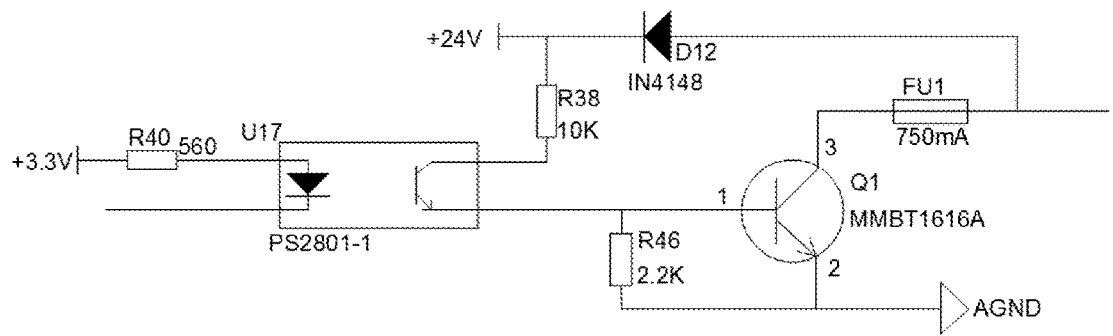
FIG. 21 is a diagram of the isolation circuit for output of the peripheral circuits of the motion control system of FIG. 1.

Referring to FIGS. 20 and 21, in the system transmission process from the controller to the spraying device, there are limit switches, sensors, indicators, start/stop signals, etc. These switch signals need to pass the level conversion and corresponding isolation before they can be input or output by FPGA. The optical coupler is designed to isolate the signal at the output end and the input end. The optical coupler has good common mode suppression ability and the signal is unidirectional transmission, which can guarantee the reliability of the signal. The input and output isolation circuit of this embodiment adopts photoelectric coupling isolator PS2801-1 for isolation, which can prevent external interference. The input isolation circuit is shown, with a total of 8 channels of digital input, and 3.3V power supply is pulled up on both sides of the optocoupler. Meanwhile, in order to avoid the influence of unstable signals on the system, capacitors are added on both sides of the circuit, which can effectively isolate the controller from the interference of strong current of the spraying device. Internal low speed digital output total 4 channels. In order to control the inductive load such as solenoid valve, the requirement of driving current is relatively large. Therefore, after PS2801-1, connect MMBT1616A SMT transistor to amplify the current and avoid the loss caused to the system when the current is suddenly interrupted.

Figure 22:
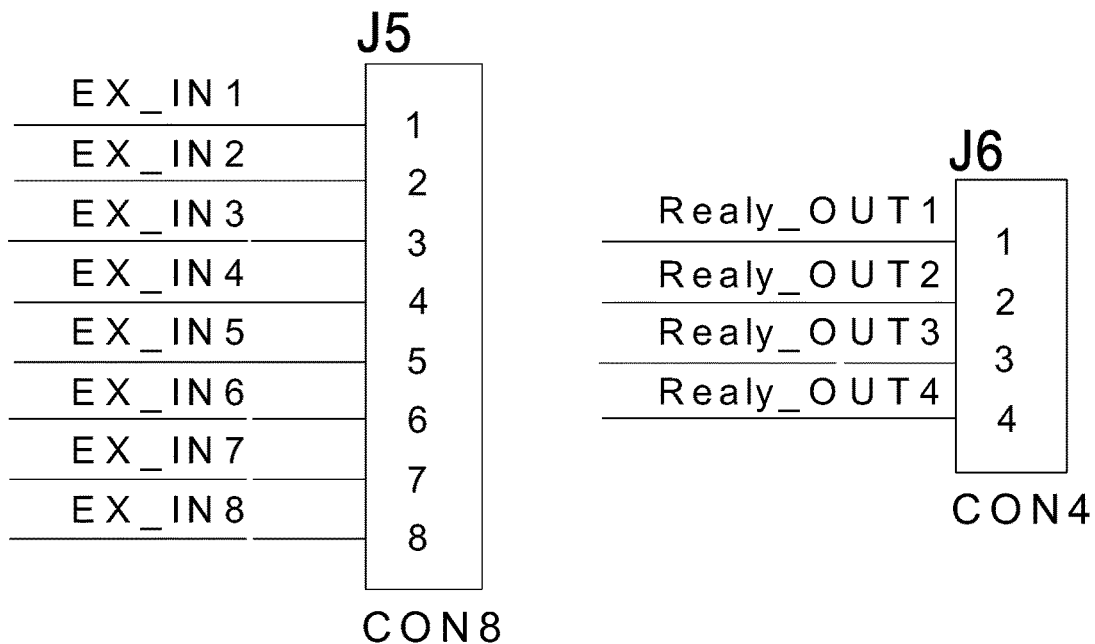
FIG. 22 is a diagram of the I/O interface circuit of the peripheral circuits of the motion control system of FIG. 1.

Referring to FIG. 22, the interface circuit of input and output is as shown. At the input end, it can be connected to peripheral equipment through terminal blocks to control the start, stop, reset, limit switch and other data quantity of each axis. At the output end, it can be connected to extended peripheral equipment, such as connecting driver, water pump, solenoid valve, etc.

Figure 23:
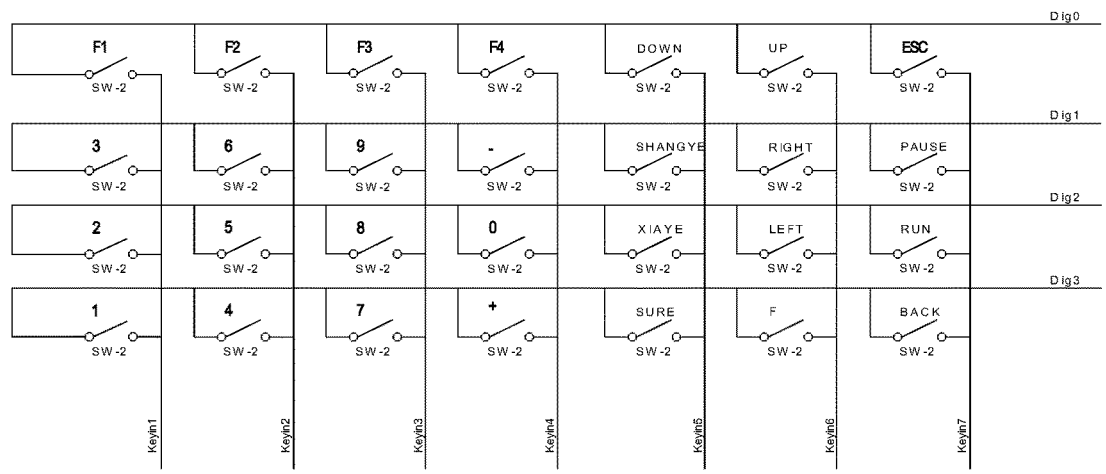
FIG. 23 is a diagram of the key circuit of the interaction module of the peripheral circuits of the motion control system of FIG. 1.
Figure 24:
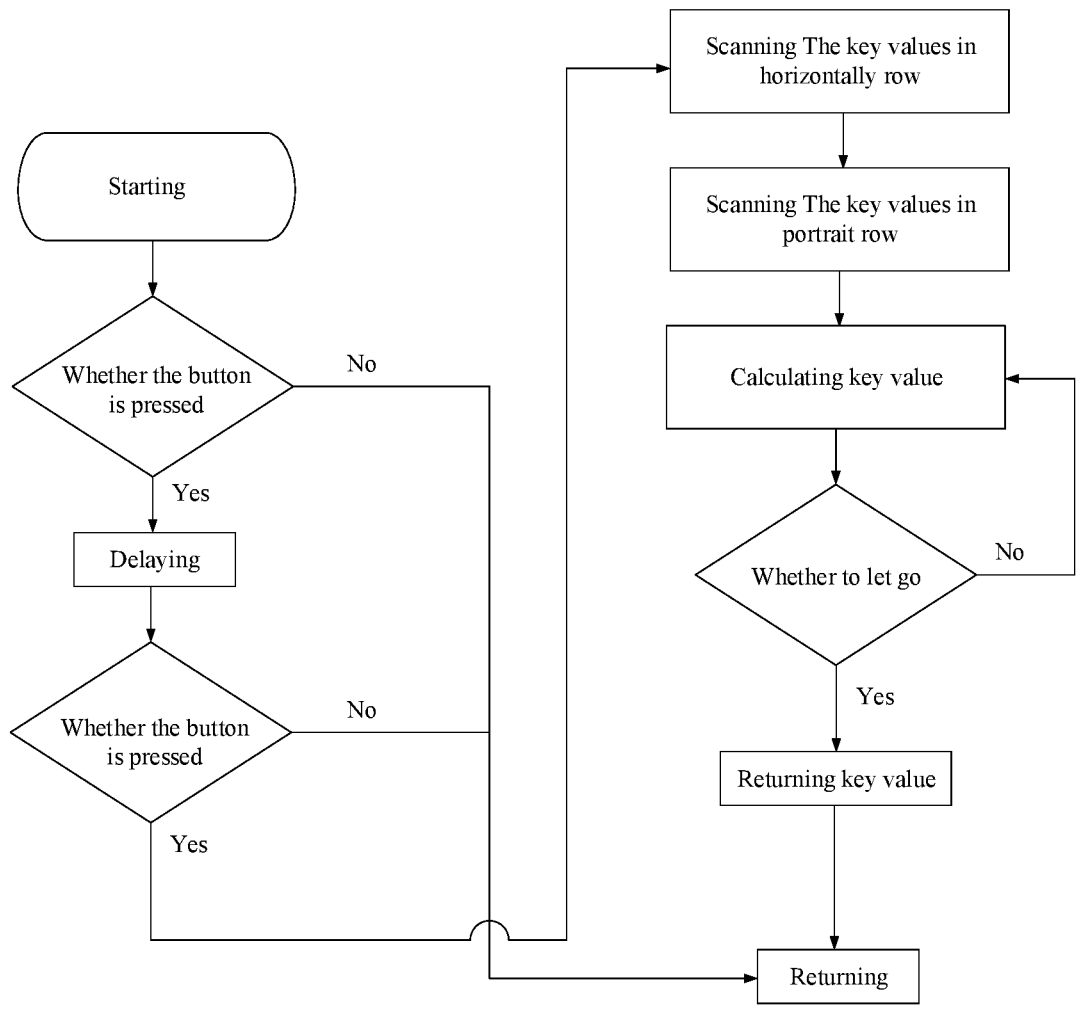
FIG. 24 is a flowchart diagram of the scanning program of the interaction module of the peripheral circuits of the motion control system of FIG. 1.

Referring to FIGS. 23 and 24, in this embodiment, the controlling can be realized by matrix keyboard, which can reduce the occupied port. The circuit includes four lines and seven lines, so the number of keys in the keyboard is 4×7. When pressing the key, two lines and lines connected to the key are connected. At this time, the level changes, and the position of the key can be determined after the MCU detects it. The functions defined by the key include ten numeric keys from '0' to '9', the input keys of minus sign and decimal point, the up, down, left and right selection keys, the confirmation and deletion keys for input information, the start and pause keys for control system operation, etc.

The system consists of 28 membrane buttons in 4 rows and 7 columns. By coding and scanning each key, determine which key was pressed. The keyboard input of the cyclic scanning method is executed in the interrupt of arm, and the keyboard scanning is detected every one millisecond. After the keyboard input, the system will be notified, because when the system detects that the keyboard input is valid, it will send the scan code access information to other subsequent links. Jitter removal is used to prevent the key from bouncing when it is released.

Figure 25:
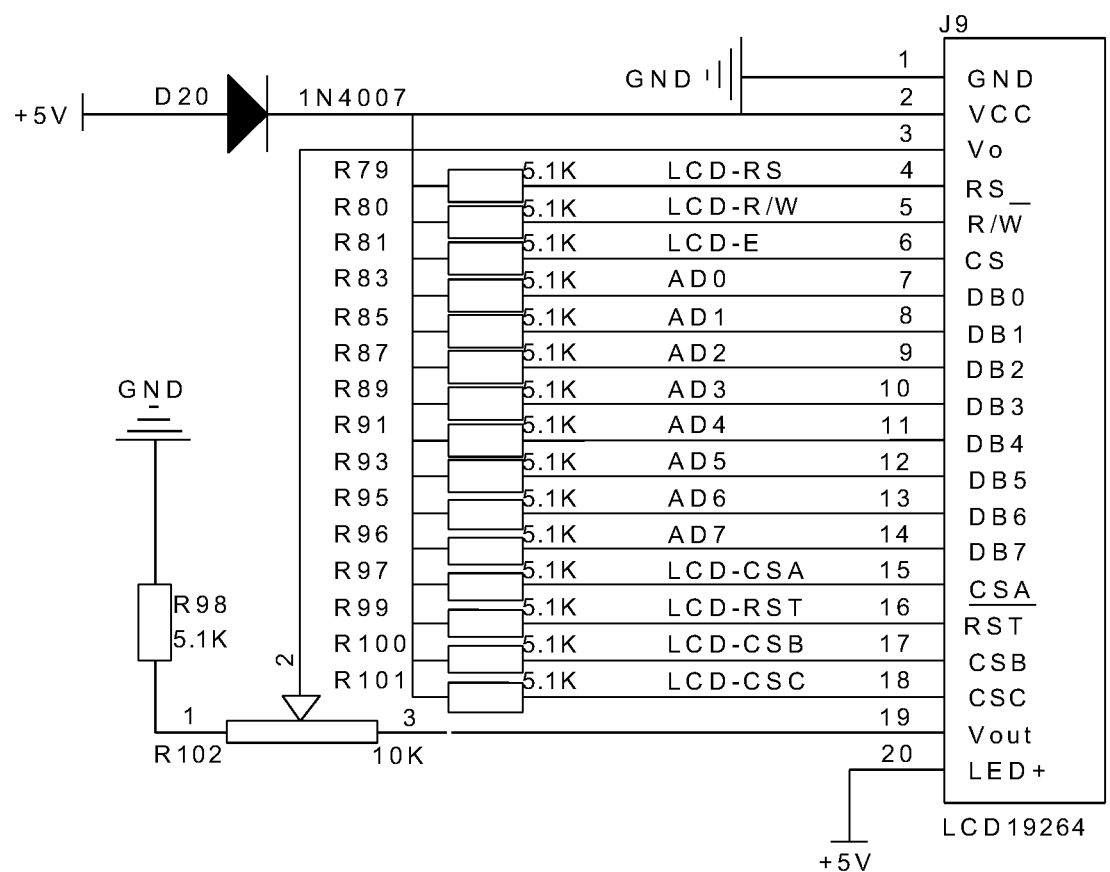
FIG. 25 is a circuit diagram of the LCD display circuit of the peripheral circuits of the motion control system of FIG. 1.

Referring to FIG. 25, the LCD display circuit is shown, and a 19264 lattice LCD module is adopted in this embodiment. 19264 lattice refers to the resolution of the LCD module, that is, there are 192*64 dots, and the LCD display circuit consists of 192 rows and 64 columns. It uses the dynamic driving principle to carry on the line control, the working voltage is 5V, and the interface with CPU uses 7-bit control bus and 8-bit parallel data bus input and output.

Figure 26:
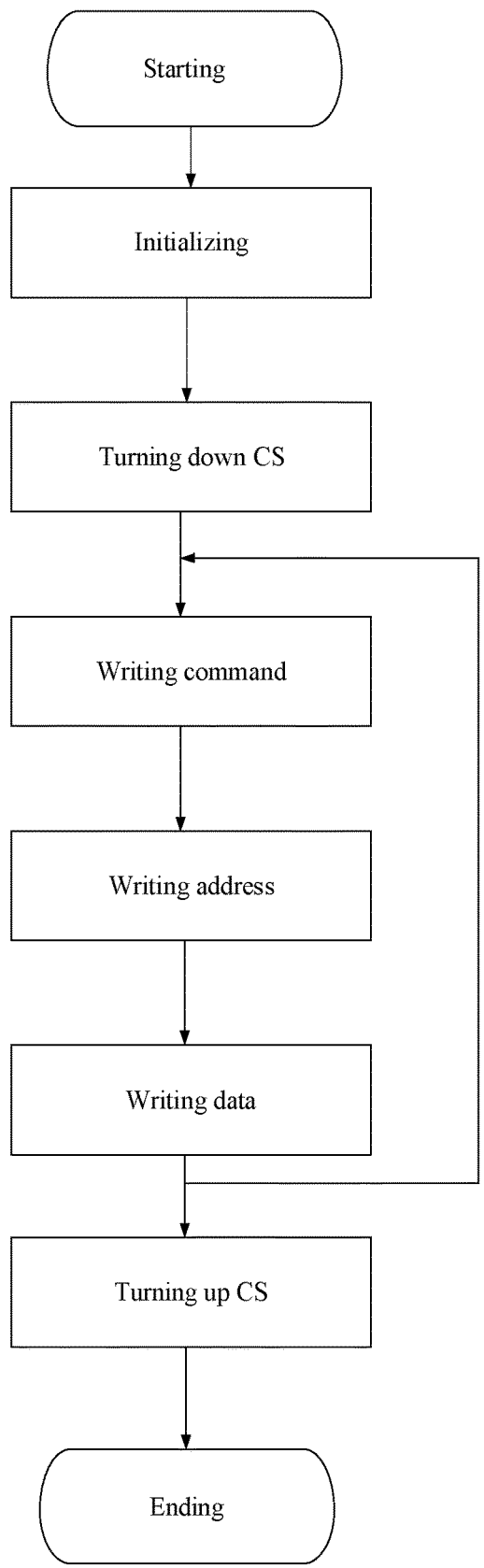
FIG. 26 is a flowchart diagram of the displaying program of the LCD display circuit of the peripheral circuits of the motion control system of FIG. 1.

Users can set the corresponding parameters of the system through the keyboard and observe the real-time dynamics of the system through the display interface. Display programming includes LCD initialization, write data, write command, display character design. To ensure the normal display of liquid crystal, it is necessary to initialize the parameters that affect its operation, such as reset liquid crystal and display contrast. When writing data or commands to the LCD module, make sure the driver timing is correct. Referring to FIG. 26, the display flow chart is shown. When the display screen continuously displays, coordinates or other contents, it will execute the write command to the write data part repeatedly.

STM32 is used as the host, FPGA is used as the slave, and the bus module uses SPI bus to realize the communication between them. SPI can send and transmit without conflict, and its clock frequency can be defined according to the application environment, which can protect against write data conflicts and bus competition. The working principle of SPI is that the host machine writes a byte to its SPI serial shift register to start the transmission, the register sends bytes to the slave through MOSI signal, and the slave sends the contents of its register back to the host through MISO signal to complete the content exchange between the two. Read and write operations are always done at the same time. If only write data is performed, the host does not need to receive the content sent back. If the host wants to read data from the machine, it needs to transmit an empty byte to trigger.

SPI transmission protocol has four control modes, which are determined by clock polarity CPOL and clock phase CPHA. Clock polarity refers to the level value of SCK signal line when SPI communication equipment is idle, CPOL=0. At this time, SCK is the low level, while CPOL=1 is the opposite. The clock phase determines when the data is sampled. When CPHA=1, the data signals are sampled along the even edge of the SCK clock, and when CPHA=0, the data signals are sampled along the odd edge of the clock. In this article, CPOL is configured as 0 and CPHA is configured as 1, that is, the clock rising edge sampling.

The main mode configuration steps for STM32 are as follows:

Initializing SPI2, setting SPI2 to the working modes of CPOL=0 and CPHA=1, and configuring the pins with reuse function; the data format is set to eight bits with the top order at the front;

Setting the SPI2 clock frequency and enable the clock;

Writing data into the register, reading the number received from the SPI data register; and Viewing SPI transfer status.

The design steps of FPGA as slave program are as follows:

Receiving chip selection, clock and data input signals from STM32, and using edge detection to obtain clock rising and falling edges for sampling or sending data; for asynchronous signals that are not in the same clock domain, the signals at both ends of the MCU and FPGA need to be synchronized, which can be realized by using two D flip-flops;

Designing of SPI communication protocol to judge whether SPI_csn is effective, the data is sampled when the rising edge of the clock is coming, and the data is sent when the falling edge is coming; defining the start and stop signals during communication, and the valid data input format is: CMD command signal+address signal addr, data signal; data is also defined as eight bits, all of which are at the top; when CMD is 1, the data is written to the address, and when CMD is 0, the data is read;

The rising edge of the signal SPI_csn represents the completion of data writing and the rising edge of SPI_clk represents the output data; the data sampling signal is obtained through edge detection and output;

SPI bus transmission module implemented in FPGA with Verilog language is shown; FPGA receives STM32 eight-bit data datai transmitted by SPI MOSI signal from the slave machine, and writes them into the corresponding register address respectively; the functional simulation waveform of SPI bus module is shown in FIG. 3.20; when the data 00, 20, 4e, 01, 00, 61, ea, 03 and 04 are written into the addresses 00, 01, 02, 03, 04, 05, 08, 09 and 0a respectively, the output data datao is displayed correctly and the data stored in each address can be read out normally.

As described above, when accelerating or decelerating, the current speed of the lance changes according to a given acceleration, so that the control process is simple, the resource consumption is small, the response is quick, the processing speed is fast, and the efficiency and real-time performance are relatively high. The interpolation module can select the first interpolation unit or the second interpolation unit to work, select the corresponding interpolation mode, and then output the direction and displacement pulse of each axis to the respective motor for driving after interpolation, so as to complete the linear or circular interpolation through the rotation of the motor. In addition, the control unit drives the corresponding second motors to control the corresponding clamp or lance to rotate and keep it perpendicular to the spray plane. In the interpolation process of the interpolation module, by using the initial data stored in a register firstly, and then to the inside of differential accumulation until a pulse overflow, while the pulse is as an equivalent pulse, it runs fast. Further, the pulse distribution is uniformity, and the motion controller can complete interpolation of multi-axis linkage machine with high processing accuracy and guarantee the real time.

Moreover, the primary processor and the motion controller can use the scheme of ARM+FPGA, this can meet a variety of requirements such as low cost, high precision, and can complete the spray to the task safe and reliable. In addition, ARM has strong real-time performance, and the control and management performance are good. Similarly, the motion control algorithm is implemented inside the FPGA, which can simultaneously control the motion of five motor axes, improving the accuracy and speed of motion control, and has extensibility.

Second Embodiment

Another motion control system of spraying machine based on FPGA is shown as an embodiment. The motion control system is similar to the motion control system in the first embodiment, except that the system further includes a spraying device. The spraying device includes a clamp, a lance, three first motors and two second motors. The first motors are used for driving the lance to move linearly along the three-dimensional direction respectively, and the second motors are used for driving the clamp and the lance to rotate respectively. The motion controller is used for controlling the spraying device with the motion information.

The information analysis module is used for decoding the motion information to obtain the action information of the lance in a three-dimensional direction, and the rotation information of the clamp and the lance. In the three-dimensional direction, each dimension corresponds to a register and an interpolation accumulator. In this embodiment, the action information includes the initial speed, given feed speed, acceleration, feed distance, initial coordinate value, endpoint coordinate value and displacement of the lance in the three-dimensional direction, the rotation information includes the rotation direction and rotation of the clamp and the lance. The information analysis module can realize the allocation of register addresses, receiving data and decoding, and it determines the interpolation mode to be executed according to the input.

The speed control module is used for driving the lance to a target position through the first motors according to the action information, and changing the speed of the interpolation movement of the lance in the three-dimensional direction into a trapezoid acceleration and deceleration. In this embodiment, the speed control module is used for calculating the travel distance and travel time of each axial direction of the lance in the acceleration stage, uniform speed stage and deceleration stage according to the initial speed, the given feed speed, the acceleration and the feed distance, and then transmitting the corresponding travel information to each of the first motors, so that the first motors drive the lance to the target position according to the corresponding travel information.

The control unit is used for rotating the clamp or the lance to reach a specified position by driving the corresponding second motor, according to the rotation information.

Third Embodiment

A motion control method is shown as an embodiment. The method is used for controlling a spraying machine. The spraying machine includes a clamp, a lance, three first motors and two second motors. The first motors are used for driving the lance to move linearly along the three-dimensional direction respectively, and the second motors are used for driving the clamp and the lance to rotate respectively.

The motion controller is used for controlling the spraying device with the motion information. The method includes following steps:

receiving a motion information;

decoding the motion information to obtain the action information of the lance in a three-dimensional direction, and the rotation information of the clamp and the lance; in the three-dimensional direction, each dimension corresponds to a register and an interpolation accumulator;

driving the lance to a target position through the first motors according to the action information, and changing the speed of the interpolation movement of the lance in the three-dimensional direction into a trapezoid acceleration and deceleration;

storing the displacement in the direction of each dimension in the corresponding register, and accumulating the displacement in the corresponding interpolation accumulator at intervals of a preset time interval, and the overflow pulse generated by each accumulation in the corresponding interpolation accumulator is used as an impulse equivalent to drive the corresponding first motor for linear interpolation;

storing the initial values of two axes in the registers corresponding to the other axis, and accumulating in two interpolation accumulators corresponding to the two axes respectively, and the overflow pulse generated by each accumulation in each interpolation accumulator is used as an equivalent pulse to drive the first motor corresponding to another axis for circular interpolation; and rotating the clamp or the lance to reach a specified position by driving the corresponding second motor, according to the rotation information.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A motion control system of spraying machine based on Field Programmable Gate Array (FPGA), comprising:

a motion controller configured to receive motion information and control a spraying machine with the motion information; the spraying machine comprising a clamp, a lance, three first motors and two second motors, and the lance displacing along three axes; the motion controller comprising:

an information analysis module, configured to decode the motion information to obtain action information of the lance in a three-dimensional direction, and rotation information of the clamp and the lance; in the three-dimensional direction, each dimension corresponding to a register and an interpolation accumulator;

a speed control module, configured to drive the lance to a target position through the first motors according to the action information, and changing the speed of the interpolation movement of the lance in the three-dimensional direction into a trapezoid acceleration and deceleration; and an interpolation module, comprising:

a first interpolation unit, configured to store the displacement in the direction of each dimension in the corresponding register, and accumulating the displacement in the corresponding interpolation accumulator at intervals of a preset time interval, and the overflow pulse generated by each accumulation in the corresponding interpolation accumulator being used as an impulse equivalent to drive the corresponding first motor for linear interpolation;

a second interpolation unit, configured to store initial values of two axes in the registers corresponding to other axis, and accumulating in two interpolation accumulators corresponding to the two axes respectively, and the overflow pulse generated by each accumulation in each interpolation accumulator being used as an equivalent pulse to drive the first motor corresponding to another axis for circular interpolation; and a control unit, configured to rotate the clamp or the lance to reach a specified position by driving the corresponding second motor, according to the rotation information.

2. The motion control system according to claim 1, wherein further comprises:

a primary processor, configured to send the motion information to the motion controller.

3. The motion control system according to claim 2, wherein the action information comprises initial speed, given feed speed, acceleration, feed distance, initial coordinate value, endpoint coordinate value and displacement of the lance in the three-dimensional direction, the rotation information comprises the rotation direction and rotation of the clamp and the lance.

4. The motion control system according to claim 3, wherein the speed control module is used for calculating the travel distance and travel time of each axial direction of the lance in the acceleration stage, uniform speed stage and deceleration stage according to the initial speed, the given feed speed, the acceleration and the feed distance, and then transmitting the corresponding travel information to each of the first motors, so that the first motors drive the lance to the target position according to the corresponding travel information.

5. The motion control system according to claim 3, wherein the calculation method of the feed distance comprises:

(1) calculating the total time of the lance in the acceleration stage, uniform speed stage and deceleration stage;

(2) calculating the first product of the total time and the initial speed;

(3) calculating the first square of the acceleration time in the acceleration stage, the second square of the deceleration time in the deceleration stage, the second product of the acceleration time and the deceleration time, and the third product of the acceleration time and the uniform time in the uniform speed stage;

(4) accumulating the first square, twice the second product, and twice the third product, then subtracting the second square from the sum result;

(5) calculating the third product of half the acceleration and the calculation result in step (4); and (6) accumulating the first product with the calculation result in step (5), and the addition result is equal to the feed distance.

6. The motion control system according to claim 5, wherein the acceleration time is equal to the deceleration time, and the calculation method of the acceleration time comprises:
  (3.1) calculating the first difference between the given feed speed and the initial speed; and
  (3.2) calculating the first ratio of the first difference to the acceleration, and the first ratio is equal to the acceleration time.

7. The motion control system according to claim 6, wherein the calculation method of the uniform time comprises:
  (3.3) calculating the third square of the given feed speed and the fourth square of the initial speed, then calculating the second difference between the third square and the fourth square;
  (3.4) calculating the second ratio of the second difference to the acceleration;
  (3.5) calculating the third difference between the feed distance and the second ratio; and
  (3.6) calculating the third ratio of the third difference to the given feed speed, and the third ratio is equal to the uniform time.

8. The motion control system according to claim 6, wherein the acceleration distance and the deceleration distance are both equal to half the second ratio, the uniform distance is equal to the fourth difference between the feed distance and the second ratio.

9. The motion control system according to claim 3, further comprising:
  an interaction module, comprising:
    a keying circuit, which has a plurality of keypad switches arranged in a matrix; the keypad switches in each line are connected at one end and the connected ends are formed as a line output end, the keypad switches in each column are connected at the other end and the other connected ends are formed as a column output end;
    a keying judgment unit, configured to determine an on-off state of the keypad switches according to the state changes of the line output ends and the column output ends, and transmitting the corresponding state information; and
    a display circuit, configured to display the on-off state according to the keying judgment unit.

10. The motion control system according to claim 9, wherein the keying judgment unit is used for transmitting the state information to the primary processor and the display circuit; the primary processor generates the motion information according to the state information.

11. The motion control system according to claim 2, wherein the primary processor is an ARM chip of STM32F407ZGT6, the motion controller is a chip of EP2C35F484C8N; the primary processor is connected to the motion controller through a bus module.

12. The motion control system according to claim 1, wherein the first motors are used for driving the lance to move linearly along the three-dimensional direction respectively, and the second motors are used for driving the clamp and the lance to rotate respectively.

13. The motion control system according to claim 1, wherein the initial position of the lance is defined as the Currently amended point, and the coordinate of the final position of the lance is $(x_e, y_e, z_e)$; the displacement of the lance in the X-axis direction is equal to the product of a constant, the accumulated times of interpolation accumulator, and the coordinate value $x_e$; the displacement of the lance in the Y-axis direction is equal to the product of the constant, the accumulated times, and the coordinate value $y_e$; the displacement of the lance in the Z-axis direction is equal to the product of the constant, the accumulated times, and the coordinate value $z_e$.

14. The motion control system according to claim 13, wherein the product of the constant and the accumulated times is equal to 1.

15. The motion control system according to claim 13, wherein the register is an m bit register, and the maximum capacity is equal to the difference between two to the power of m and 1; the accumulated times is equal to two to the power of m.

16. The motion control system according to claim 15, wherein in the two-dimensional plane, the calculation method of the driving displacement of the second interpolation unit in one axis direction comprises:
  (3.7) calculating the fourth product of the real-time position coordinate of the other axis and the incremental time of the second interpolation unit;
  (3.8) accumulating the fourth product in each increment; and
  (3.9) calculating the fourth ratio of the result in step (3.8) to two to the power of m, and the fourth ratio is equal to the driving displacement.

17. The motion control system according to claim 1, wherein the speed control module comprises:
  a first divider, configured to divide the frequency of the generated system clock to generate a sampling pulse;
  an integrator, configured to multiply the sampling pulse with the given feed speed to obtain a speed increment;
  a speed accumulator, configured to accumulate an initial speed with the speed increment to obtain the real-time speed of the lance;
  a first comparator, configured to compare the real-time speed and the given feed speed;
  a second divider, configured to calculate the clock frequency according to the frequency of an output pulse when the real-time speed is less than the given feed speed;
  a third divider, configured to divide the clock frequency and generating an output pulse for driving the first motors to accelerate;
  a counter, configured to count the output pulse and generating a count value; and
  a second comparator, configured to compare twice the count value and a preset total number of pulses; when the total number is no more than twice the count value, the motion controller is used for slowing down the lance through the first motors.

18. The motion control system according to claim 1, wherein further comprises:
  a power module, comprises:
    a first voltage conversion circuit, configured to convert an external input voltage of 24V to a voltage of 5V;
    a second voltage conversion circuit, configured to convert the voltage of 5V to a voltage of 3.3V; and
    a third voltage conversion circuit, configured to convert the voltage of 3.3V to a voltage of 1.2V.

19. A motion control system of spraying machine based on Field Programmable Gate Array (FPGA), comprising:
  a spraying device, comprising:
    a clamp;
    a lance;
    three first motors, configured to drive the lance to move linearly along a three-dimensional direction respectively, displacing the lance along three axes; and two second motors, configured to drive the clamp and the lance to rotate respectively;

a primary processor, configured to send motion information; and a motion controller, the motion controller comprising:
   an information analysis module, configured to decode the motion information to obtain action information of the lance in the three-dimensional direction, and rotation information of the clamp and the lance; in the three-dimensional direction, each dimension corresponding to a register and an interpolation accumulator;

a speed control module, configured to drive the lance to a target position through the first motors according to the action information, and changing the speed of the interpolation movement of the lance in the three-dimensional direction into a trapezoid acceleration and deceleration; and an interpolation module, comprising:
      a first interpolation unit, configured to store the displacement in the direction of each dimension in the corresponding register, and accumulating the displacement in the corresponding interpolation accumulator at intervals of a preset time interval, and the overflow pulse generated by each accumulation in the corresponding interpolation accumulator being used as an impulse equivalent to drive the corresponding first motor for linear interpolation;

a second interpolation unit, configured to store initial values of two axes in the registers corresponding to other axis, and accumulating in two interpolation accumulators corresponding to the two axes respectively, and the overflow pulse generated by each accumulation in each interpolation accumulator being used as an equivalent pulse to drive the first motor corresponding to another axis for circular interpolation; and a control unit, configured to rotate the clamp or the lance to reach a specified position by driving the corresponding second motor, according to the rotation information.

* * * * *